(12) United States Patent
Fujino et al.

(10) Patent No.: US 7,783,737 B2
(45) Date of Patent: Aug. 24, 2010

(54) SYSTEM AND METHOD FOR MANAGING SUPPLY OF DIGITAL CONTENT

(75) Inventors: Shuji Fujino, Ayase (JP); Daisuke Miyazaki, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/205,516

(22) Filed: Sep. 5, 2008

(65) Prior Publication Data
US 2009/0070444 A1 Mar. 12, 2009

Related U.S. Application Data

(63) Continuation of application No. 10/941,010, filed on Sep. 10, 2004, now abandoned.

(30) Foreign Application Priority Data
Apr. 16, 2004 (JP) ............................ 2004-121387

(51) Int. Cl.
G06F 15/173 (2006.01)
(52) U.S. Cl. ...................... 709/223; 707/812
(58) Field of Classification Search ......... 709/223–224; 711/162
See application file for complete search history.

(56) References Cited

U.S. PATENT DOCUMENTS

| | | | |
|---|---|---|---|
| 5,806,057 A | 9/1998 | Gormley et al. | |
| 5,859,972 A | 1/1999 | Subramaniam et al. | |
| 6,167,425 A | 12/2000 | Beckhoff | |
| 6,314,418 B1 | 11/2001 | Namba | |
| 6,757,778 B1 | 6/2004 | van Rietschote | |
| 6,775,830 B1 | 8/2004 | Matsunami et al. | |
| 6,832,272 B2 * | 12/2004 | Hirakawa et al. | 710/36 |
| 6,959,360 B2 * | 10/2005 | Murotani et al. | 711/114 |
| 7,028,137 B2 * | 4/2006 | Nashimoto et al. | 711/112 |
| 7,127,445 B2 * | 10/2006 | Mogi et al. | 707/1 |
| 7,143,112 B2 * | 11/2006 | Yagawa | 707/104.1 |
| 2003/0188233 A1 * | 10/2003 | Lubbers et al. | 714/100 |
| 2004/0024975 A1 * | 2/2004 | Morishita et al. | 711/147 |
| 2004/0194061 A1 | 9/2004 | Fujino | |
| 2005/0071526 A1 | 3/2005 | Brokenshire et al. | |
| 2005/0138308 A1 * | 6/2005 | Morishita et al. | 711/162 |
| 2005/0234966 A1 | 10/2005 | Fujino et al. | |

(Continued)

FOREIGN PATENT DOCUMENTS

JP 06-012348 A 1/1994

(Continued)

OTHER PUBLICATIONS

Japan Patent Office (JPO) office action for JPO patent application JP2004-121387 (Jan. 13, 2010).

*Primary Examiner*—Salad Abdullahi
(74) *Attorney, Agent, or Firm*—Townsend and Townsend and Crew LLP

(57) ABSTRACT

Digital content is stored in a logical volume provided in a storage system connected to a communications network. A sub-management computer selects a destination computer forming a supply destination for digital content from a plurality of business computers or virtual computers, further selects the address information corresponding to the selected destination computer from a plurality of address information components, and allocates the selected address information to the digital content itself or to the storage device.

13 Claims, 26 Drawing Sheets

U.S. PATENT DOCUMENTS

| | | |
|---|---|---|
| 2005/0235288 A1 | 10/2005 | Yamakabe et al. |
| 2006/0248307 A1* | 11/2006 | Yamamoto et al. .......... 711/170 |
| 2006/0277196 A1 | 12/2006 | Oosawa et al. |

FOREIGN PATENT DOCUMENTS

| | | |
|---|---|---|
| JP | 09-218777 A | 8/1997 |
| JP | 09-237189 A | 9/1997 |
| JP | 2000-276336 A | 10/2000 |
| JP | 2002-007329 | 1/2002 |
| JP | 2002-268984 A | 9/2002 |
| JP | 2003-005991 A | 1/2003 |
| JP | 2003-330833 A | 11/2003 |
| JP | 2004-038686 A | 2/2004 |
| WO | WO00/31652 A2 | 6/2000 |
| WO | WO00/31652 A3 | 6/2000 |

* cited by examiner

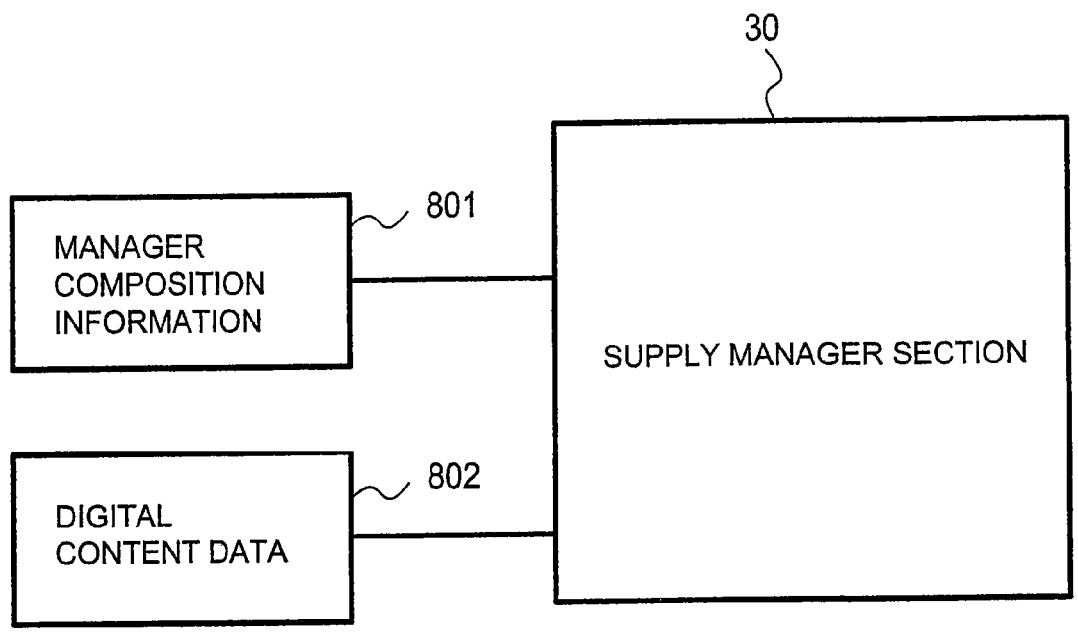

FIG. 7

| No. | DIGITAL CONTENT NAME | DIGITAL CONTENT DATA |
|---|---|---|
| 1 | PROGRAM A (BUSINESS PROGRAM) | (POINTER 1) |
| 2 | PROGRAM B | (POINTER 2) |
|   | DATA C | (POINTER 3) |
|   | DATA D | (POINTER 3) |
| 3 ) n | ⋮ | ⋮ |

820A

| No. | COMPUTER NAME | SUPPLY STATUS |
|---|---|---|
| 1 | Tokyo 1 | SUPPLIED |
| 2 | Tokyo 1-1 | SUPPLYING |
| 3 | Tokyo 1-2 | DELETING |
| 3 ) n | ⋮ | ⋮ |

| No. | BUSINESS COMPUTER NAME | BUSINESS COMPUTER ADDRESS | VIRTUAL COMPUTER FLAG | VIRTUAL COMPUTER NAME | VIRTUAL COMPUTER ADDRESS |
|---|---|---|---|---|---|
| | | 601 | 602 | 603 | 604 |
| 1 | Toyko1 | c1, c2, c3, c4 | NO (1) | — | — |
| 2 | Tokyo1 | c1, c2, c3, c4 | YES (1) | Tokyo1-1 | c1, c2, c6, c8 |
| 3 | Tokyo1 | c1, c2, c3, c4 | YES (1) | Tokyo1-2 | c1, c2, c6, c7 |
| 4 | Tokyo2 | b1, b2, b3, b4 | NO (1) | — | — |
| ~q | ...... | ...... | ...... | ...... | ...... |

| No. | VIRTUAL COMPUTER NAME | VIRTUAL COMPUTER IDENTIFIER | VIRTUAL COMPUTER ADDRESS |
|---|---|---|---|
| 1 | Tokyo1-1 | 10011 | c1, c2, c6, c8 |
| 2 | Tokyo1-2 | 10012 | c1, c2, c6, c7 |
| ⋮ | ⋮ | ⋮ | ⋮ |

840

| DIGITAL CONTENT NAME | DBMS USE INDICATOR | DBMS SHARED USE PERMISSION | DIGITAL CONTENT DATA |
|---|---|---|---|
| PROGRAM A | YES | YES | (POINTER 1) |
| PROGRAM B | NO | – | (POINTER 2) |
| ⋮ | ⋮ | ⋮ | ⋮ |

820A

SYSTEM AND METHOD FOR MANAGING SUPPLY OF DIGITAL CONTENT

CROSS-REFERENCES TO RELATED APPLICATIONS

This application claims priority to Japanese Patent Application No. 2004-121387, filed Apr. 16, 2004, and is a continuation of pending U.S. patent application Ser. No. 10/941,010 entitled "SYSTEM AND METHOD FOR MANAGING SUPPLY OF DIGITAL CONTENT," filed Sep. 10, 2004, both of which are hereby incorporated by reference, as if set forth in full in this document, for all purposes.

BACKGROUND OF THE INVENTION

1. Field of the Invention

The present invention relates to a technology for managing supply of digital content to computers.

2. Description of the Related Art

For example, in a computer system where digital content, such as data, programs, and the like, is supplied from a server to a client computer, generally, preparations must be made, such as installing a computer program for supplying digital content in both the server computer and the client computer (hereinafter, this program is called a "supply management program"), and setting up the required environment, for example. A virtual computer, for example, may be used as the client computer. Examples of technology relating to virtual computers are disclosed in Japanese Patent Laid-open No. 2002-530780 and Japanese Patent Laid-open No. 2002-7329.

Conventionally, the aforementioned preparations are carried out manually. However, virtual computers may be generated and eliminated on a dynamic basis. Therefore, if virtual computers of this kind are used as destinations for digital content, then whenever a virtual computer is generated dynamically, it is necessary to undertake preparatory tasks, such as installing a supply management program, manually in the virtual computer. However, it can be seen that, in practice, it is impossible to carry out the aforementioned preparations manually, each time the creation of a virtual computer is detected at some point on the communications network, and even if it were possible, this would place a huge burden on the user.

Even in cases where the destinations of the digital content are not virtual computers, if manual work is required for the aforementioned preparations, then this still places a burden on the user and the same type of problem exists. Furthermore, problems of this kind are not limited to systems for supplying digital content, and similar problems may also exist when constructing other types of computer system.

Furthermore, in the prior art, manual work has been required not only for the aforementioned preparations, but also for the actual operation of supplying digital content. This can also be regarded as placing a burden on the user.

SUMMARY OF THE INVENTION

It is an object of the present invention to reduce the burden on the user required in supplying digital content.

It is a further object of the present invention to reduce the burden on the user required in constructing a computer system.

Further objects of the present invention will become apparent from the following description.

The supply management system according to an aspect of the present invention is a supply management system wherein digital content is stored in a storage device provided in a storage system connected to a communications network; the supply management system comprising: a supply destination information storing region for storing a plurality of supply destination IDs corresponding respectively to a plurality of destination candidate computers; a supply destination selecting section for selecting a destination computer forming the supply destination for the digital content, from the plurality of supply candidate computers, and selecting the supply destination ID corresponding to the destination computer, from the plurality of supply destination IDs; and a supply destination ID allocating section for allocating the selected supply destination ID to the digital content or the storage device, via the communications network. Thereby, for example, the digital content to which the supply destination ID is allocated (or the digital content in the storage device to which the supply destination ID is allocated) is supplied to the destination computer (for example, the digital content assumes a supplyable status from the storage device to the destination computer).

The storage device may be a physical storage device (for example, a hard disk drive), or it may be a logical storage device provided on one or a plurality of physical storage devices.

For example, the Digital content may be a or more computer programs, a or more sets of data, a or more information components, or the like.

Moreover, the destination candidate computers may be any type of computer. For example, the destination candidate computer may be a server (such as a blade server, one-U (1U) server), or a virtual computer generated inside a server (more specifically, a virtual computer generated or deleted dynamically by a virtual computer generating and deleting program in a server, for example).

The supply destination ID (in other words, the computer ID, for example) may be any type of ID provided that it identifies the destination candidate computer, such as the destination name, IP address, MAC address, WWN (worldwide name), iSCSI name, or the like.

Furthermore, allocating a supply destination ID to digital content signifies, for example, ordering the storage system to embed a supply destination ID into the digital content, or to supply the digital content to the destination computer corresponding to the supply destination ID, in response to which, the storage system supplies that digital content to the destination computer. In the former case, for example, if a plurality of digital content components are stored in the storage device, then the storage device is searched to locate the supply destination ID corresponding to that destination computer, and the digital content thus located can then be supplied from the storage system to the destination computer.

Furthermore, allocating a supply destination ID to a storage device signifies ordering the storage system to permit a destination computer to access the storage device corresponding to that destination computer, or ordering the storage system to supply the digital content in that storage device to the destination computer corresponding to the supply destination ID, in response to which, the storage system supplies the digital content to the destination computer. In the former case, more specifically, for each of a plurality of storage devices, the storage system stores associations between the device ID of the storage device and the supply destination IDs which that storage device is permitted to access. The supply management system associates the supply destination ID of a destination computer with the device ID of the storage device corresponding to that destination computer (or alternatively, it writes the supply destination ID to the storage device corresponding to the destination computer). In this case, if the storage system has received a request for access to a certain storage device, for example, then it judges whether or not the supply destination ID of the computer issuing the access request is associated with the device ID of that storage device (or alternatively, it judges whether or not the supply destination ID is stored in that storage device), and if it is associated, then it permits access to that storage device.

In a preferred mode of the invention, the supply management system further comprises a supply destination information updating section for receiving, if a virtual computer is generated dynamically on the communications network, a virtual ID of the newly generated virtual computer, and writing that virtual ID as a supply destination ID to the supply destination information storing region. The supply destination ID allocating section allocates, upon receiving the virtual ID, the received virtual ID to the digital content or the storage device.

In a preferred mode of the present invention, the supply management system further comprises an access path reporting section for reporting an access path to the digital content or storage device to which the selected supply destination ID has been allocated, to the destination computer corresponding to the selected supply destination ID. In this mode, for example, the supply management system may send a program generation request containing an access path, to the destination computer.

In a preferred mode of the present invention, the supply management system further comprises a push supply section for commanding the storage system to supply the digital content to the destination computer corresponding to the selected supply destination ID.

In a preferred mode of the present invention, the supply management system further comprises an environmental setting data generating section for generating environmental setting data for the exclusive use of the destination computer corresponding to the selected supply destination ID. The supply destination ID allocating section allocates the selected supply destination ID to the environmental setting data thus generated.

In a preferred mode of the present invention, the supply management system further comprises: a supply completion detecting section for detecting that the digital content has been supplied to the destination computer corresponding to the selected supply destination ID; and an allocation terminating section for terminating the allocation of the selected supply destination ID, when it has been detected that the digital content has been supplied.

The supply management method according to an aspect of the present invention comprises the steps whereby: a supplying computer stores a plurality of supply destination IDs corresponding respectively to a plurality of destination computers; the supplying computer selects a destination computer forming a supply destination for the digital content in a storage device provided in a storage system connected to a communications network, from a plurality of destination candidate computers; the supplying computer selects the supply destination ID corresponding to the destination computer from the plurality of supply destination IDs; the supplying computer allocates the selected supply destination ID to the digital content or the storage device, via the communications network; the destination computer or the storage system manages access to the digital content from the destination computer, on the basis of the supply destination ID allocated to the digital content or the storage device; and the destination computer reads out the digital content from the storage device, on the basis of the results of the step of managing access.

In a preferred mode of the present invention, the destination computer is a server or a virtual computer generated by the server, and the digital content is a computer program, and furthermore, the supplying computer sends a program generation request containing the selected supply destination ID, to the server, and the server performs a step of installing the computer program in the server in response to the program generation request, if the supply destination. ID contained in the program generation request indicates the server, or installing the computer program in the virtual computer in response to the program generation request, if the supply destination ID contained in the program generation request indicates the virtual computer. For example, the installing step may be implemented in accordance with an environmental setup program, if the computer program incorporates an environmental setup program, whereas if this is not the case, it may be implemented in accordance with an environmental setup program corresponding to the computer program which can be read out by the server by means of the aforementioned supply destination ID being allocated to that environmental setup program.

In a preferred mode of the present invention, for example, a storage management section for managing communications with the storage system is provided previously in the server. If a virtual computer is to be generated in a server, and the supplying computer has detected that there is no virtual computer management program present in that server, then it may set a virtual computer management program for generating or deleting virtual computers dynamically, as the digital content, and allocate the supply destination ID of the server to that virtual computer management program. Besides this, the supplying computer may also send a command to the storage system or the server in order that respective types of digital content are supplied from the storage system in a suitable sequence, on the basis of program composition information in the server, for example (such as information indicating which composition is used to construct which programs). Finally, the supplying computer manages the supply to the server of an environmental setup program, and environmental setting data generated on the basis of attribute information relating to the server or virtual computer (for example, the program composition information or resource information relating to the OS, memory, or the like). Furthermore, the supplying computer may embed one or a plurality of supply destination IDs in the environmental setting data. In this case, for example, if the supply destination IDs of both a server and a virtual computer generated in that server are set in the environmental setting data, then it is possible to construct a program, which is one type of digital content, on the basis of the same environmental setting data.

The storage system according to yet a further aspect of the present invention comprises a storage device for storing digital content, connected to a communications network to which a supply management system for managing supply of digital content is connected; and a storage management device. The storage management device receives the allocation of a supply destination ID of a destination computer forming a supply destination for the digital content, from among a plurality of supply destination IDs corresponding respectively to a plurality of destination candidate computers connected to the communications network, from the supply management system via the communications network, the supply destination ID being allocated to the digital content or the storage device; and supplies the digital content to which the supply destination ID is allocated, or the digital content in the storage device to which the supply destination ID is allocated, to the destination computer, in response to a request from the supply management system or the destination computer.

According to the present invention, the burden on the user required in supplying digital content is reduced.

Furthermore, according to the present invention, the burden on the user required to construct a computer system is also reduced.

BRIEF DESCRIPTION OF THE DRAWINGS

FIG. 3 shows a supply manager section 30 provided in a management computer 1;

FIG. 4 shows an example of the composition of an manager composition information 801;

FIG. 7 shows an example of the composition of digital content data 820;

FIG. 8 shows an example of the composition of sub-manager composition information 600;

DETAILED DESCRIPTION OF THE INVENTION

Below, an embodiment of the present invention is described with reference to the drawings. Here "digital content (or contents)" principally means electronic components (for example, environmental setting data, and the like) required in order to construct a prescribed computer system. However, in a broader sense, it may also include components which are exchanged after the construction of the computer system.

Figure 1:
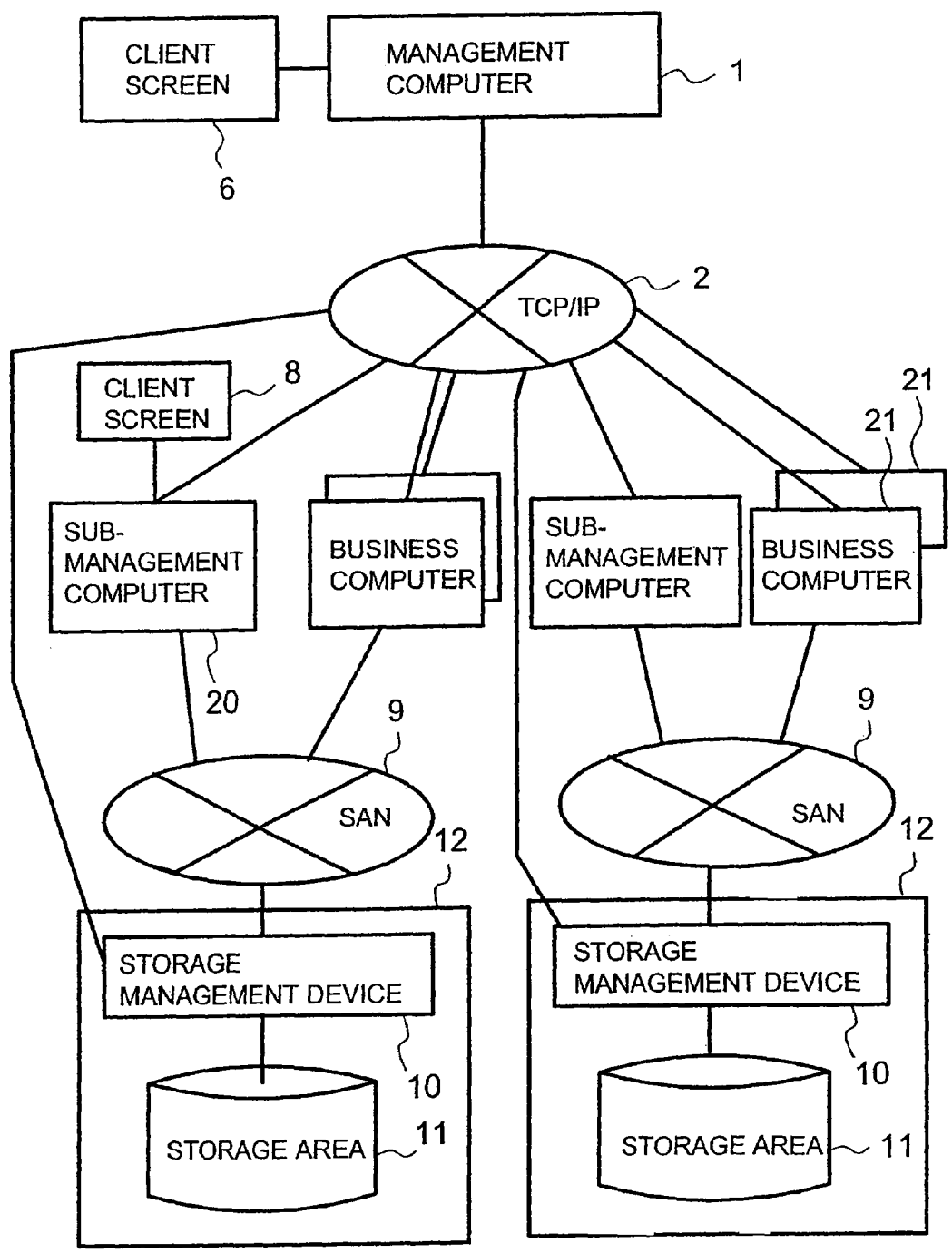
FIG. 1 shows an example of the composition of a computer system relating to one embodiment of the present invention.

FIG. 1 shows an example of the composition of a computer system relating to one embodiment of the present invention.

In this computer system 3, one or a plurality of SAN (Storage Area Network) systems 4 are provided. In each of the SAN systems 4, one or more sub-management computers 20, a plurality of business computers 21, and one or more storage systems 12, are connected respectively to a SAN 9 (although this is not limited to a SAN 9, it being possible to adopt another type of network, such as an IP-SAN). Furthermore, the sub-management computers 20 and the business computers 21 are connected to a TCP/IP network 2, such as the Internet or a LAN (Local Area Network), (the storage system 12 may also be connected to the TCP/IP network 2).

The sub-management computer 20 is a computer machine, such as a personal computer, work station, or the like. The sub-management computer 20 manages the SAN system 4 in which it is provided (and in particular, it manages the business computers 21 or the storage system 12). Furthermore, the sub-management computer 20 carries out processing for supplying digital content stored in the storage area 11 of the storage system 12, to a business computer 21 selected from the plurality of business computers 21, or to a virtual computer selected from a plurality of virtual computers generated inside that business computer 21. The sub-management computer 20 may or may not be provided with a client screen 8.

A business computer 21 is a server for performing certain prescribed business tasks. The business computer 21 obtains digital content from the storage system 12, under the management of the sub-management computer 20.

The storage system 12 is, for example, a RAID (Redundant Array of Independent Inexpensive Disks) system provided with a storage area 11 consisting of a plurality of physical disks (for example, hard disk drives) disposed in an array. A storage management device 10 is provided for managing the writing and reading of data, to and from the storage area 11.

A management computer 1 for managing the respective SAN systems 4 may also be provided in the computer system 3. The management computer 1 is a computer machine, such as a personal computer, workstation, server, or the like, which is capable of accessing the sub-management computers 20 and the business computers 21 of the respective SAN systems 4, via a TCP/IP network 2. The management computer 1 may be provided with a client screen 6.

A generic computer hardware composition (for example, a composition similar to a generic computer comprising a CPU, memory, hard disk, and the like) can be used for the hardware in the sub-management computers 20, the business computers 21 and the management computer 1. Therefore, the hardware composition of these respective computers 20, 21 and 1 is not illustrated in the drawings, and no detailed description of this hardware composition is given here.

The foregoing description gives an overview of the computer system 3 relating to the present embodiment. In other words, each SAN system 4 comprises a SAN 9 and a plurality of computers connected to that SAN 9, and the computer system 3 is constituted by one or more SAN system 4, and a management computer 1 for managing the respective SAN systems 4.

Figure 2:
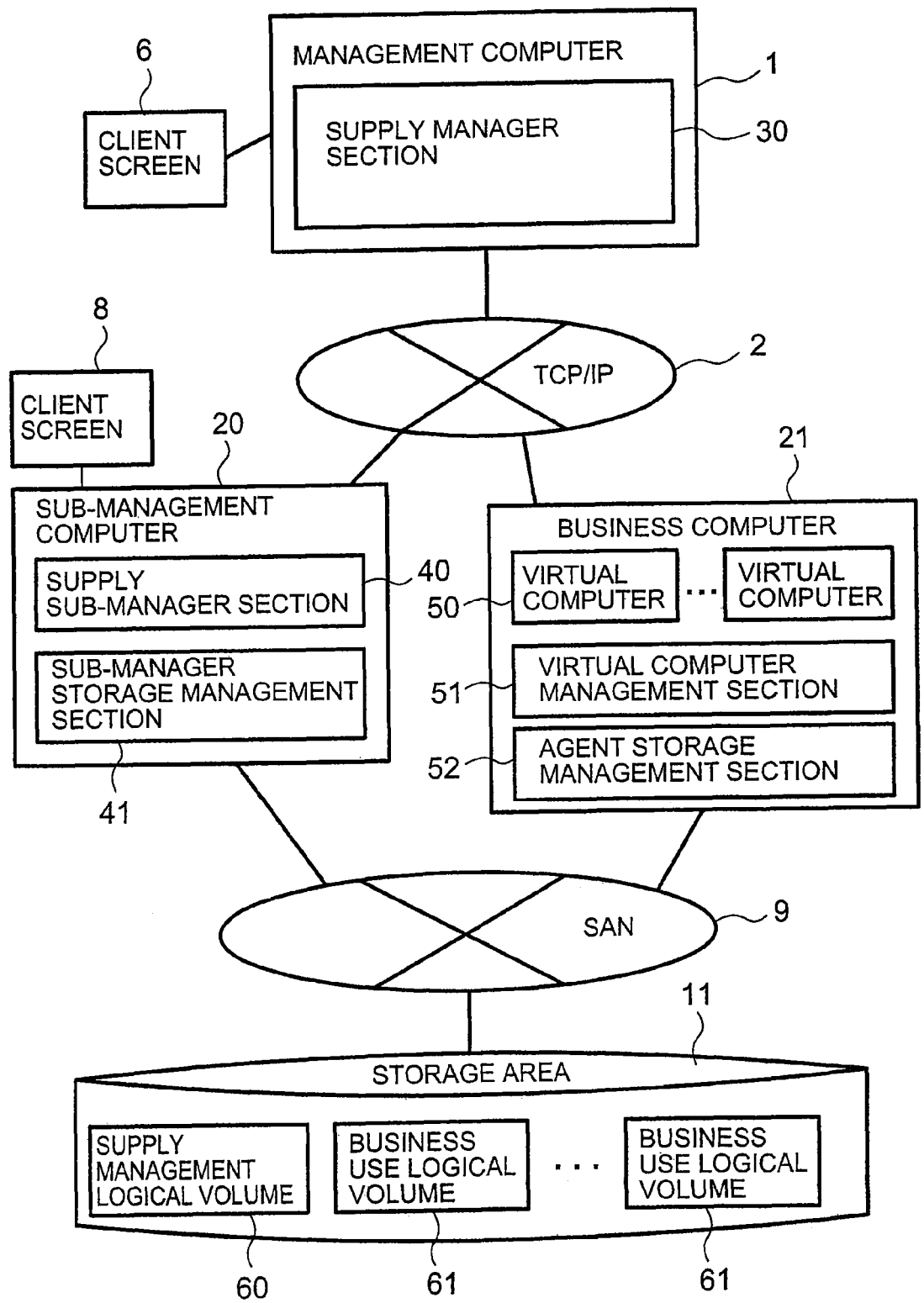
FIG. 2 is a diagram showing details of the constituent elements of the computer system shown in FIG. 1.

FIG. 2 is a detailed illustration of the constituent elements of the computer system shown in FIG. 1.

The management computer 1 comprises a supply manager section 30 for managing the respective sub-management computers 20 connected to the TCP/IP network 2, and the like. The supply manager section 30 is a computer program, for example, which is read into the CPU of the management computer 1 and implemented by same.

The sub-management computer 20 comprises a supply sub-manager section 40 for managing the digital content and the computers to which it is to be supplied, and the like, and a sub-manager storage management section 41 for managing the access paths to the respective digital content in the storage area 11 (hereinafter, called "storage data paths"), and the like. Both of these sections 40 and 41 are computer programs, for example, which are read into the CPU of the sub-management computer 20 and implemented by same.

The business computer 21 comprises an agent storage management section 52 for managing communications with the storage system 11, and the like, and a virtual computer management section 51 for generating or deleting a virtual computer 50. Virtual computers 50 are generated in the business computer 21, or virtual computers 50 are deleted from the business computer 21, by means of the virtual computer management section 51. The respective sections 51 and 52 are computer programs, for example, which are read into the CPU of the business computer 21 and are implemented by same.

A plurality of logical volumes, which are logical storage devices, can be provided in the storage area 11. More specifically, for example, a supply management logical volume 60 for storing one or a plurality of digital content components, and one or a plurality of business use logical volumes 61 corresponding respectively to the one or plurality of business computers 21 are provided in the storage area 11. The business use logical volumes 61 are not strictly necessary. If no business use logical volume 61 is provided, then the respective business computers 21 may access the supply management logical volume 60 and acquire the respective digital content components from that volume 60, for example. Moreover, in this case, the sub-management computer 20 may implement unique settings in the respective business computers 21, for example, via the TCP/IP network 2 (for instance, it may transmit unique environmental setting data to the business computers 21).

The storage management device 10 generates new business use logical volumes 61 in the storage area 11, and copies the digital content held in the supply management logical volume 60 to the business use logical volumes 61, in accordance with commands from the sub-manager storage management section 41, for example. Moreover, if the storage management device 10 receives a read command from the sub-management computer 20 or a business computer 21, for instance, then it reads out the digital content in the logical volume 60 or 61, in accordance with the command, and sends this information to the sub-management computer 20 or business computer 21. On the other hand, if the storage management device 10 receives a write command from the sub-management computer 20 or a business computer 21, for instance, then it writes digital content from the sub-management computer 20 or the business computer 21 to the logical volume 60 or 61 according to the command.

The respective sections described above will be explained in detail.

FIG. 3 illustrates the supply manager section 30 provided in the management computer 1.

The supply manager section 30 refers to the manager composition information 801 and the plurality of digital content data 802 stored in the storage device (for instance, the memory) of the management computer 1, which is not illustrated, and it performs processing based on the results of this reference operation. The manager composition information 801 is a table wherein a plurality of sub-management computer information components are recorded corresponding respectively to a plurality of sub-management computers 20, as illustrated in FIG. 4. The sub-management computer information contains, for example, the sub-management computer number, the sub-management computer name and the sub-management computer address (such as the IP address of the sub-management computer). The digital content data 802 is similar to the digital content data managed by the respective sub-management computers 20 as illustrated in FIG. 7, and corresponds to a plurality of sub-management computers 20.

Figure 5:
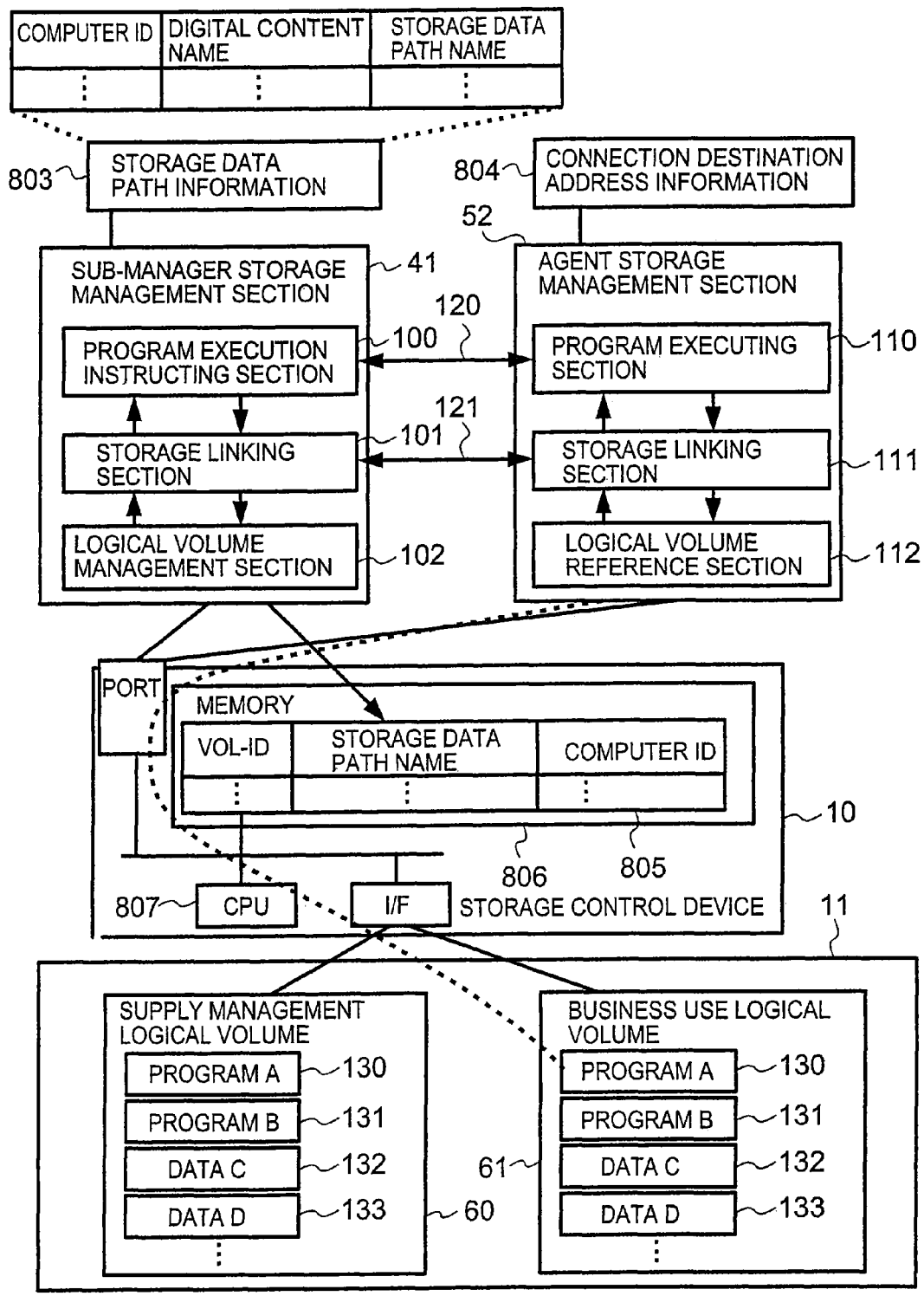
FIG. 5 shows a sub-manager storage management section 41 provided in a sub-management computer 20, an agent storage management section 52 provided in a business computer 21, a storage control device 10, a supply management logical volume 60 in a storage area 11, and a business use logical volume 61.

FIG. 5 shows the sub-manager storage management section 41 provided in a sub-management computer 20, the agent storage management section 52 provided in a business computer 21, the storage management device 10, and the supply management logical volume 60 and business use logical volume 61 provided in the storage area 11.

The sub-manager storage management section 41 refers to the storage data path information 803 stored in a storage device (for example, a memory) of the sub-management computer 20 (not illustrated), for example, and it carries out processing on the basis of the results of this reference operation. The storage data path information 863 contains, for example, one or more digital content names corresponding respectively to a plurality of computer IDs (such as the computer name or IP address of business computers 21 or virtual computers 50), and storage data path names to these information components. The storage data path name is the access path name from the computer indicated by the corresponding computer ID (such as the business computer 21), to the corresponding business use logical volume 61, or to the respective digital content components copied to that business use logical volume 61.

Furthermore, the sub-manager storage management section 41 comprises computer programs, such as a program execution instructing section 100, a storage linking section 101, and a logical volume management section 102. These sections 100, 101 and 102 are, for example, read into the CPU in the sub-management computer 20 and implemented by same.

The program execution instructing section 100 executes processing for requesting a business computer 21 which has issued a storage data path opening request (described hereinafter), to execute a program (one of the digital content components) that has been obtained on the basis of the storage data path name opened in response to the storage data path opening request, via the TCP/IP network 2.

The storage linking section 101 receives a storage data path opening request from a storage linking section 111 of the business computer 21 (described hereinafter) and in response to this request, it opens a storage data path name, reports the storage data path name thus opened to the storage linking section 111, closes that storage data path name, and so on. Here, "opening" a storage data path name means permitting the read out of digital content based on that storage data path name, and "closing" a storage data path name means prohibiting said read-out.

A logical volume management section 102 manages access to the logical volumes 60 or 61 (or to the respective digital content components in the logical volumes 60 or 61) in the respective business computers 21 or virtual computers 50. For example, the logical volume management section 102 registers the computer ID (such as the computer name or IP address) of the business computer 21 authorized to access the business use logical volume 61 relating to an opened storage data path name, in association with the volume ID of that logical volume 61, in a volume management table 805 that is managed by the storage system 12. Thereby, a storage data path name to that logical volume 61 is opened for that particular business computer 21. Moreover, if a business computer 21 is to be prohibited access to a business use logical volume 61 by closing the storage data path name, then the logical volume management section 102 deletes the computer ID of that business computer 21, which was associated with the volume ID of the logical volume 61, from the volume management table 805. In this way, the storage data path name is closed for that business computer 21.

The agent storage management section 52 refers to the connection destination address information 804 stored in a storage device (for example, a memory) of the business computer 21 (not illustrated), and carries out processing on the basis of this reference operation. The connection destination address information 804 contains, for example, the computer ID (such as the IP address) of the sub-management computer 20 managing the agent storage management section 52.

Furthermore, the agent storage management section 52 comprises computer programs, such as a program execution section 110, a storage linking section 111 and a logical volume reference section 112. These sections 110, 111 and 112 are, for example, read into the CPU in the business computer 21 and implemented by same.

In response to an instruction from the program execution instructing section 100, the program execution section 110 carries out processing for executing (namely, installing or activating) a program (one of the digital content components) acquired via the TCP/IP network 2 on the basis of the storage data path name opened in accordance with a storage data path opening request.

The storage linking section 111 carries out processing for issuing a storage data path opening request to a sub-management computer 20 specified by the connection destination address information 804, via the TCP/IP network 2, or receiving the report of an opened storage data path name in response to such an opening request, and the like.

The logical volume reference section 112 carries out processing for referring to the digital content (for example, the program) corresponding to the storage data path name received by the storage linking section 111.

The storage management device 10 comprises a CPU 807 and a memory 806, for example. A volume management table 805 is provided in the memory 806. The volume management table 805 lists the one or plurality of logical volumes present in the storage area 11, and corresponding to each of these logical volumes, it records the volume ID, the storage data path name to the logical volume, and the ID of the computer authorized to access the logical volume. If the CPU 807 receives an access request to a certain logical volume from a computer outside the storage system 12, then it is able to manage access to the logical volume, on the basis of the contents of the volume management table 805 and the ID of the computer issuing the access request. For example, if the ID of the computer issuing the access request is not associated with the ID of the logical volume subject to the access request in the volume management table 805, then the CPU 807 prohibits access. However, if it is associated with the logical volume ID, then the CPU 807 can permit access to the digital content contained in that logical volume.

The supply management logical volume 60 stores, for example, program a 130, program b 131, data c 132 and data d 133, or the like, as one or a plurality of digital content components, for example. In accordance with a command from the sub-manager storage management section 41, the storage management device 10 is able to pair one or a plurality of business use logical volumes 61 with the supply management logical volume 60, and copy the digital content in the supply management logical volume 60 to the one or plurality of business use logical volumes 61 thus paired. Furthermore, in accordance with a command from the sub-manager storage management section 41, the storage management device 10 can multiplex one or more business use logical volumes 61 in a paired state with the supply management logical volume 60, multiplex the digital content received with a write command from the sub-management computer 21, in the memory 806, and write all of the digital content together to the supply management logical volume 60 and the one or more business use logical volumes 61.

Figure 6:
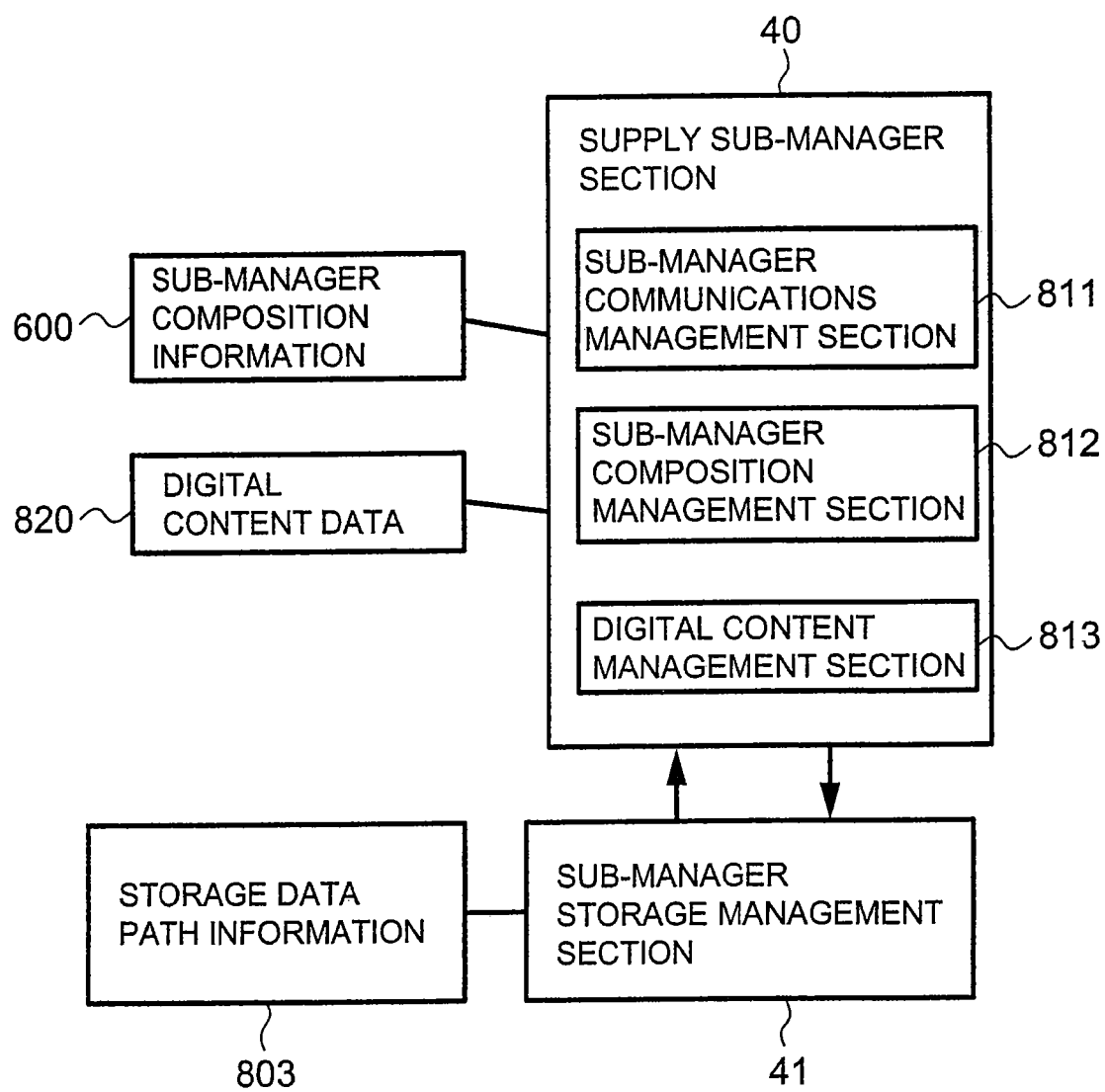
FIG. 6 shows a supply sub-manager section 40 in a sub-management computer 20.

FIG. 6 shows a supply sub-manager section 40 in the sub-management computer 20.

The supply sub-manager section 40 comprises, for example, a plurality of computer programs, such as a sub-manager communications management section 811, a sub-manager composition management section 812, and a digital content management section 813. These sections 811, 812 and 813 are, for example, read in to CPU of the sub-management computer 20 and implemented by same.

The sub-manager communications management section 811 manages communications performed by the sub-management computer 20 via the TCP/IP network 2.

The sub-manager composition management section 812 carries out processing on the basis of results obtained by referencing sub-manager composition information 600 described hereafter.

The digital content management section 813 carries out processing on the basis of results obtained by referencing digital content data 820 described hereafter.

The supply sub-manager section 40 references the digital content data 820 and the sub-manager composition information 600 stored, for example, in a storage device (such as the memory) of the sub-management computer 20 (not illustrated), and carries out processing on the basis of the results of this reference operation.

FIG. 7 shows an example of the composition of digital content data 820.

The digital content data 820 comprises first digital content sub-data 820A and a plurality of second digital content sub-data 820B.

The first digital content sub-data 820A contains, for each of the plurality of digital content components stored in the supply management logical volume 60, the name of the digital content and corresponding supply destination information which is a pointer to the second digital content sub-data 820B.

The plurality of second digital content sub-data 820B correspond respectively to the plurality of digital content components. Each of the second digital content sub-data 820B contains the name of the computer forming the supply destination for the corresponding digital content (for example, the name of the business computer 21 or virtual computer 50), and the supply status relating to that computer. For example, this supply status may be "supplied", indicating that the information has supplied to the destination computer, "supplying", indicating that processing for supplying the information to the destination computer is currently in progress, or "deleting", indicating that processing for deleting the registration of the information in the destination computer is currently in progress.

By referring to the digital content data 820 illustrated in this diagram, the digital content management section 813 can ascertain which destination computers are assigned to which digital content components, as well as the supply status relating to these destination computers.

FIG. 8 shows an example of the composition of the sub-manager composition information 600.

The sub-manager composition information 600 registers which of the business computers 21 is connected to the SAN 9 and what kind of virtual computers 50 are present in each of the business computers 21. For example, the sub-manager composition information 600 is a table comprising rows and columns. The sub-manager composition information 600 contains, for example, business computer names, business computer addresses (such as the business computer IP address), a virtual computer flag indicating whether or not a computer is a virtual computer (which indicates that a computer is a virtual computer if the flag is "1", for instance), a virtual computer name and a virtual computer address (such as the IP address of the virtual computer). In this sub-manager composition information 600, in a row registering information relating to a business computer 21, such as row 601 or row 604, for example, the virtual computer flag is not raised and the columns relating to the virtual computer name and the virtual computer address are left blank. However, in a row registering information relating to a virtual computer 50, such as row 602 or row 603, for example, the virtual computer flag is raised and information is registered in the virtual computer name and virtual computer address columns.

By referring to this sub-manager composition information 600, the sub-manager composition management section 812 can ascertain which business computers 21 are connected to the SAN 9, and which virtual computers 50 are present in which business computers 21. Furthermore, by referring to the aforementioned digital content data 820, using a business computer name or a virtual computer name registered in the sub-manager composition information 600, the sub-manager composition management section 812 is also able to ascertain which digital content components have been supplied to which business computers or virtual computers. In other words, by means of the digital content data 820 and the sub-manager composition information 600 described above, the respective digital content components are associated with the business computers or virtual computers to which they are to be supplied.

Figure 9:
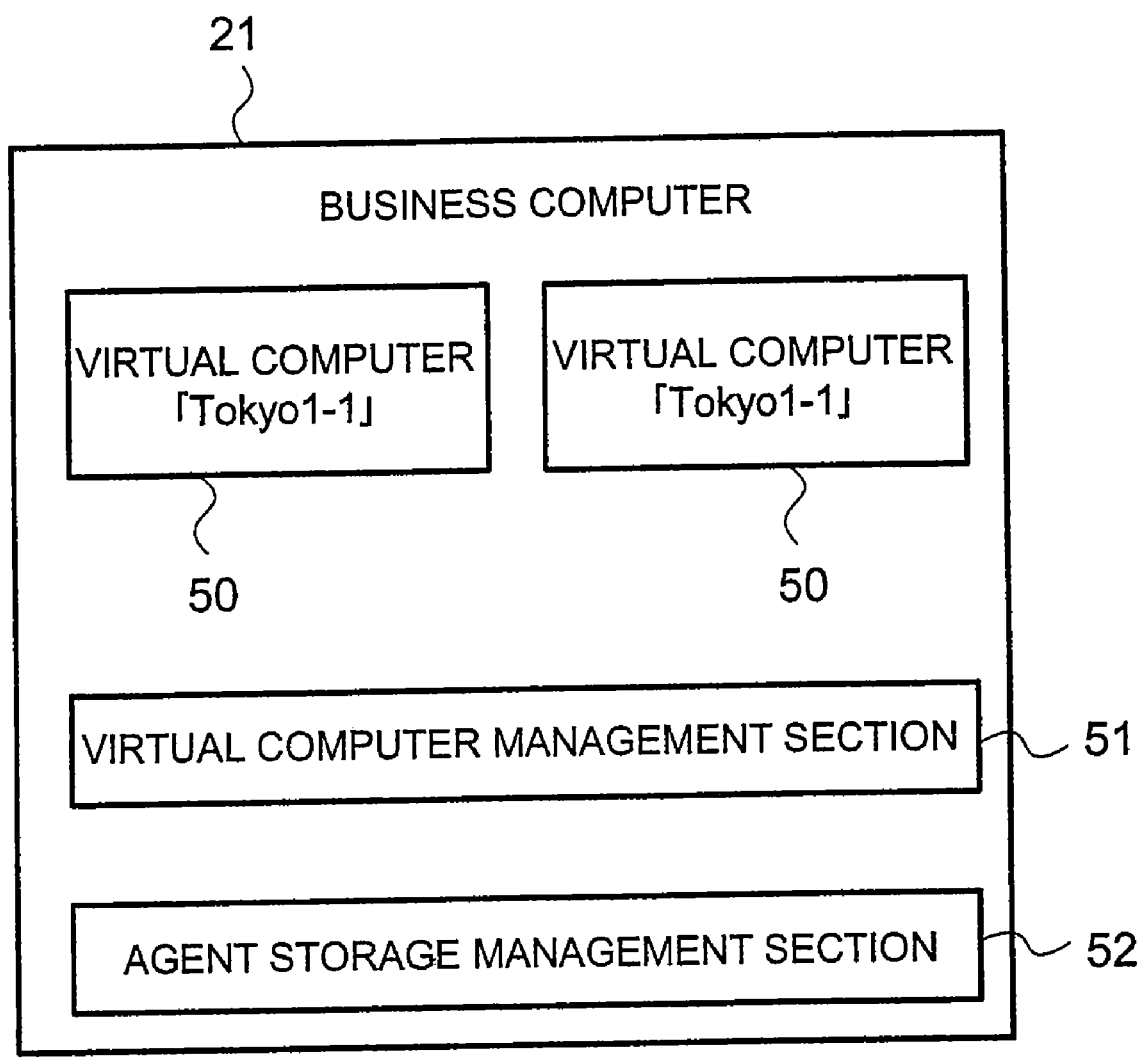
FIG. 9 shows an example of the composition of a business computer 21 relating to rows 601-603 in FIG. 8.

FIG. 9 shows an example of the composition of a business computer 21 relating to rows 601 to 603 in FIG. 8.

This business computer 21 having the business computer name "Tokyo1" comprises, in addition to the agent storage management section 52 and the virtual computer management section 51 described above, a virtual computer 50 having the business computer name "Tokyo1-1", and a virtual computer 50 having the business computer name "Tokyo1-2".

Figure 10:
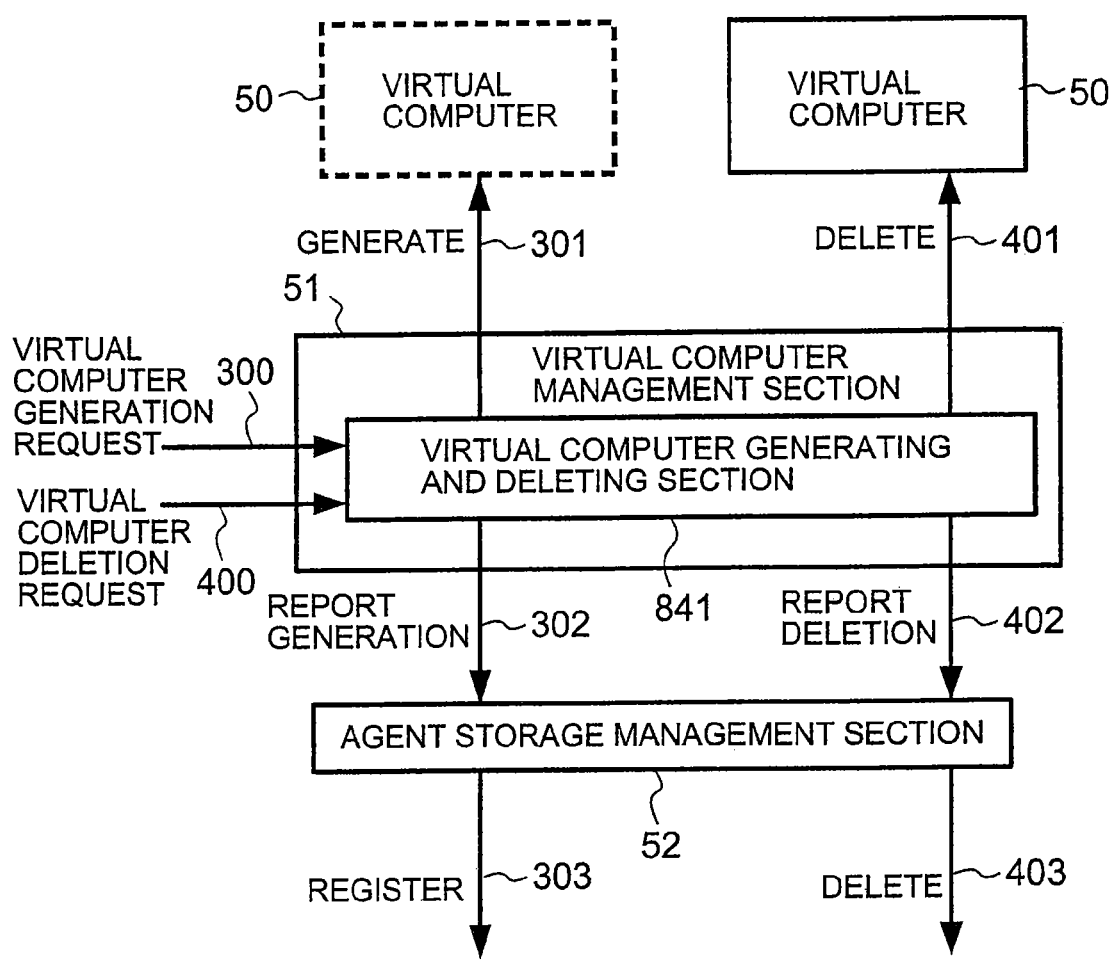
FIG. 10 shows a virtual computer management section 51.

FIG. 10 shows a virtual computer management section 51.

This virtual computer management section 51 comprises a virtual computer generating and deleting section 841. The virtual computer generating and deleting section 841 may receive, for example, a virtual computer generation request 300 and generate a new virtual computer in response to this request 300, as indicated by the arrow 301. In this case, the virtual computer management section 51 also sends a report indicating that it has generated a new virtual computer, along with virtual computer information relating to that virtual computer (such as the virtual computer name, identifier, and virtual computer address), to the agent storage management section 52, as indicated by the arrow 302. Furthermore, as indicated by arrow 303, the agent storage management section 52 registers the virtual computer information thus received in a virtual computer management table (in other words, a virtual computer list) 840 such as that illustrated in FIG. 11. The virtual computer information relating to the respective virtual computers present in the business computer 21 is registered in the virtual computer management table 840.

The virtual generation request 300 may be a request issued by a user by means of a command, or the like, or it may be a request from a program, such as the agent storage management section 52.

The virtual computer generating and deleting section 841 may receive, for example, a virtual computer deletion request 400, and delete a virtual computer in response to this request 400, as indicated by the arrow 401. Furthermore, in this case, the virtual computer management section 51 sends a report indicating that the virtual computer has been deleted, and virtual computer information relating to this virtual computer, to the agent storage management section 52, as indicated by the arrow 402. Moreover, the agent storage management section 52 deletes the virtual computer information matching the received virtual computer information, from the virtual computer management table 840, as indicated by the arrow 403.

The virtual computer deletion request 400 may be a request issued by a user by means of a command, or the like, or it may be a request from a program, such as the agent storage management section 52.

Figures 11, 12:
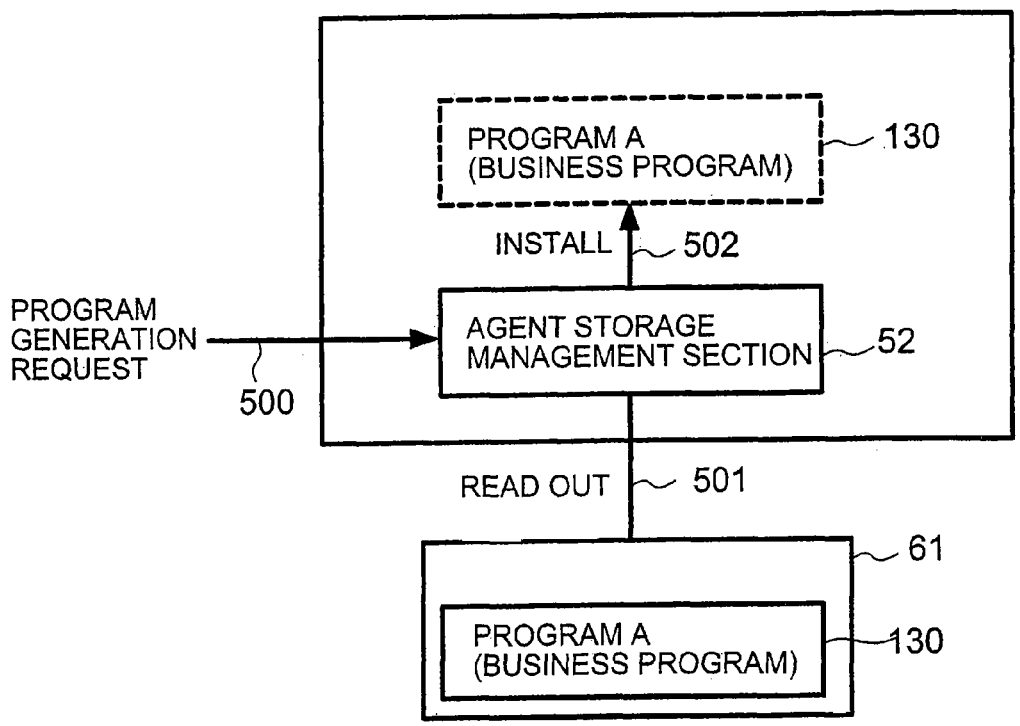
FIG. 11 shows an example of the composition of a virtual computer management table 840.
FIG. 12 shows an overview of processing carried out up to and including the step of installing a business program, which is one type of digital content, in a business computer.

FIG. 12 shows an overview of processing carried out up to installation of a business program, which is one type of digital content component, in a business computer.

For example, as shown by arrow 500, the agent storage management section 52 receives a program generation request including an opened storage data path name, from a sub-management computer 20. In this case, as indicated by the arrow 501, the agent storage management section 52 reads out program a (business program) 130 from the business use logical volume 61 corresponding to the business computer 21 in which it is installed, for example, in accordance with the storage data path name. In accordance with the aforementioned program generation request, the agent storage management section 52 executes an installation program (not illustrated) which is contained in the program a (business program) 130 thus read out, as indicated by the arrow 502. Thereby, the program a (business program) 130 is generated inside the business computer 21.

Figure 13:
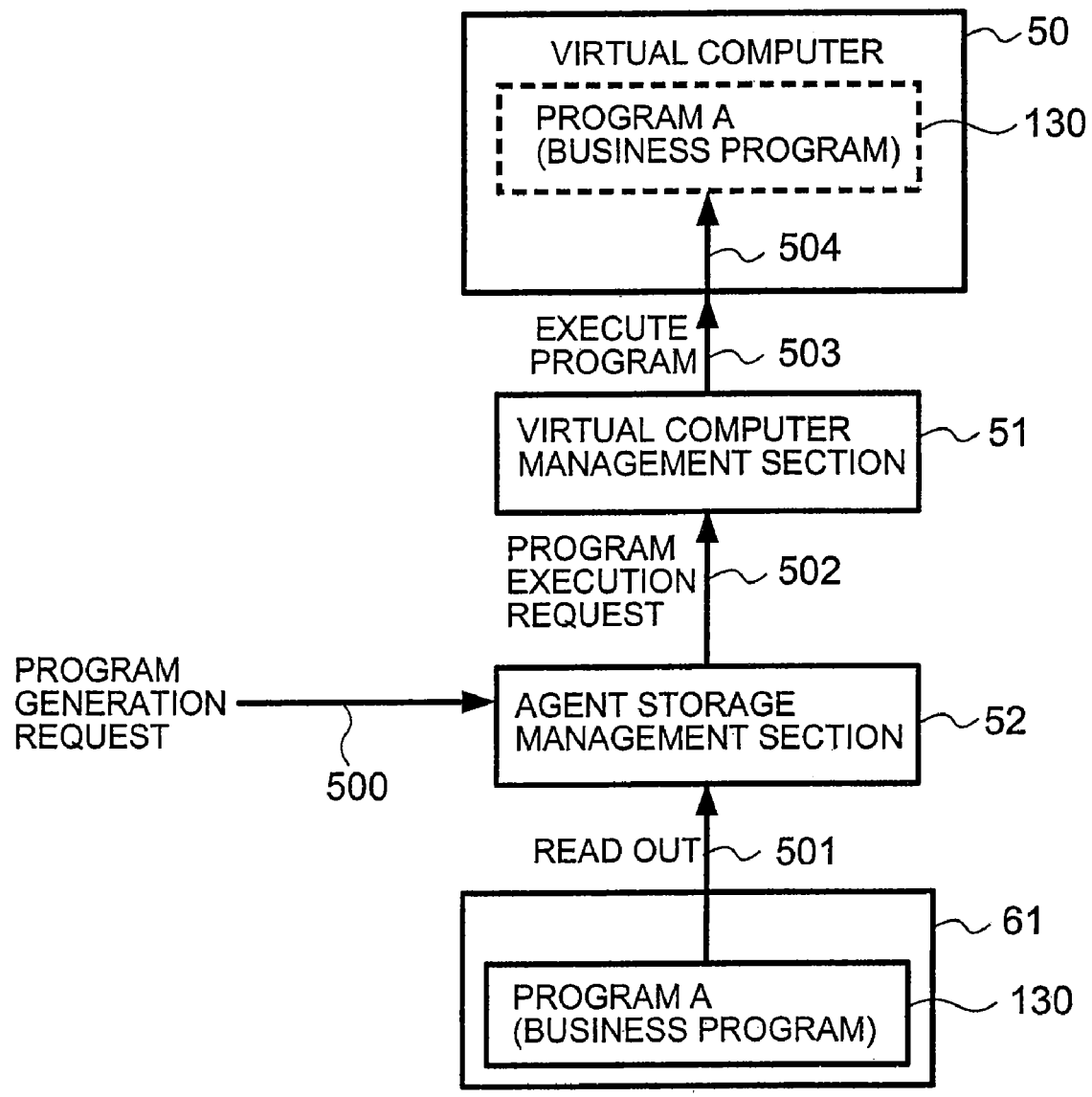
FIG. 13 shows an overview of processing carried out up to and including the step of installing a business program, which is one type of digital content, in a virtual computer.

FIG. 13 shows an overview of the processing carried out up to and including the installation of the business program, which is one type of digital content component, in a virtual computer.

For example, as indicated by the arrow 500, the agent storage management section 52 receives a program generation request including an opened storage data path name, from a sub-management computer 20. In this case, the agent storage management section 52 reads out program a (business program) 130 from the business use logical volume 61 corresponding to the business computer 21 in which it is installed, for example, in accordance with the storage data path name, as indicated by the arrow 501.

Next, in accordance with the aforementioned program generation request, the agent storage management section 52 requests the virtual computer management section 51 to execute the program a (business program) 130 thus read out, as indicated by the arrow 502. In this case, the virtual computer management section 51 executes an installation program (not illustrated) contained in the program a (business program) 130, as indicated by the arrow 503. Thereby, the program a (business program 130) is generated inside the virtual computer 50, as indicated by the arrow 504.

The program generation request described with reference to FIG. 12 or FIG. 13 may contain a computer ID indicating the installation destination of the supplied program. More specifically, for example, the sub-management computer 20 may send a program generation request containing the storage data path name for program a and a computer ID indicating the destination for the program, to the business computer 21 forming the destination (or to the business computer 21 containing the virtual computer 50 forming the destination). In this case, the agent storage management section 52 of the business computer 21 may implement the processing described with reference to FIG. 12 or FIG. 13, selectively, depending on whether the computer ID contained in the program generation request indicates a business computer 21 or a virtual computer 50. It is possible to identify whether the computer ID indicates a business computer 21 or a virtual computer 50 by referring to the virtual computer management table 840, for example. If there is a corresponding entry, then the ID relates to a virtual computer, and if there is no corresponding entry, then it relates to a business computer.

Furthermore, the program generation request described with reference to FIG. 12 or FIG. 13 may also contain a digital content ID (for example, a digital content name) indicating which program is to be installed. More specifically, for example, if the sub-management computer 20 is instructing the generation of program a, then it may send a program generation request containing the digital content ID for program a, to the business computer forming the supply destination (or to the business computer 21 containing the virtual computer 50 forming the supply destination). In this case, if the agent storage management section 52 of the business computer 21 has read in a plurality of digital content components in accordance with the storage data path name, for example, then it may select and install the digital content component indicated by the digital content ID contained in the program generation request, from this plurality of digital content components. (In other words, it may execute an environmental setup program for the selected digital content component).

Below, the processing carried out in the present embodiment is described in more detail.

Figure 14:
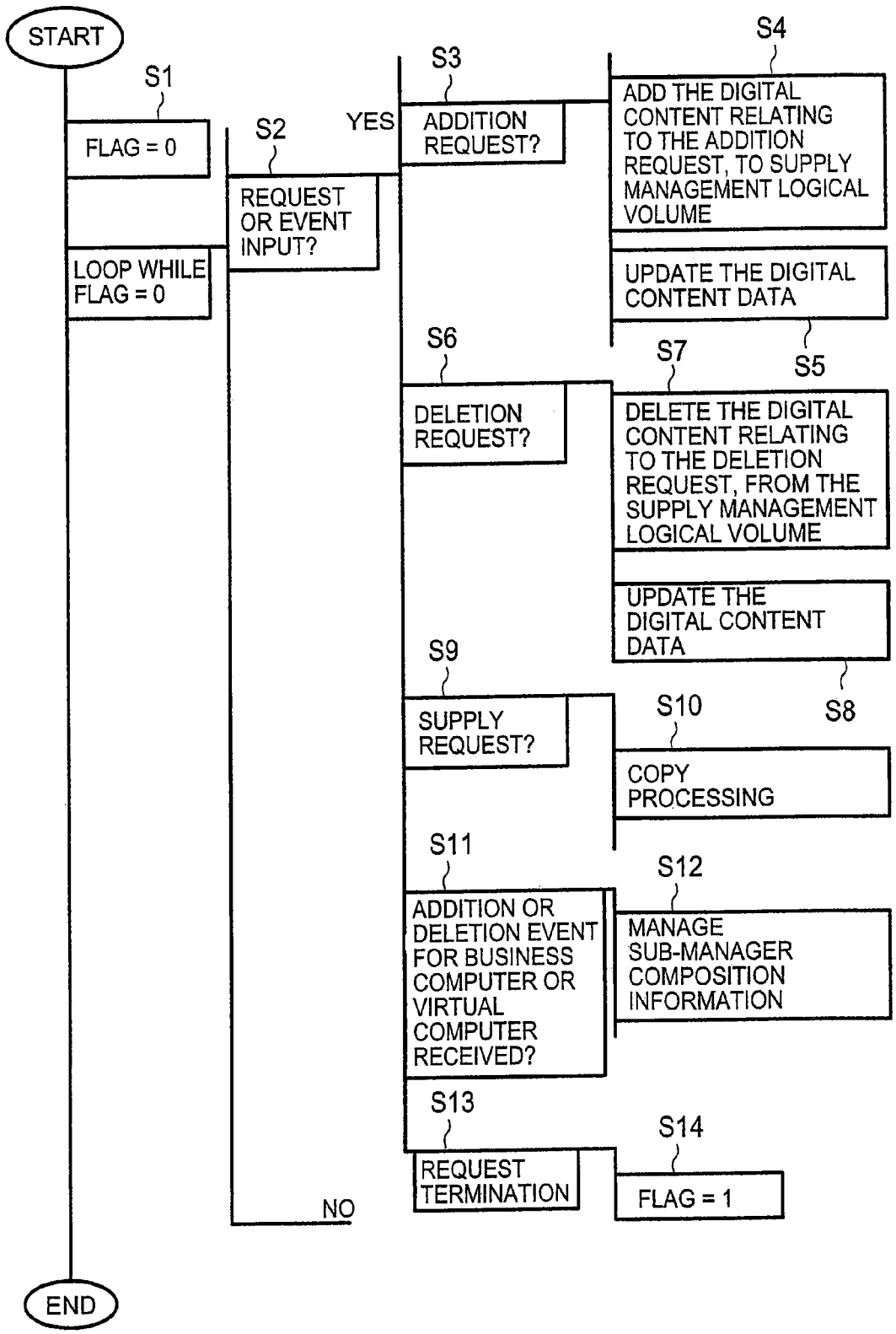
FIG. 14 shows one example of a processing sequence carried out by a sub-management computer 20.

FIG. 14 shows one example of a processing sequence implemented by a sub-management computer 20.

If the internal flag is zero (S1) and a prescribed request or event is input (Yes at S2), then the sub-management computer 20 implements the following processing, for example.

The sub-manager storage management section 41 receives a digital content addition request, via the supply sub-manager section 40 or the client screen (S3). In this case, the sub-manager storage management section 41 issues a command to the storage system 12 via the SAN 9, instructing it to write information to the supply management logical volume 60, and hence the new digital content corresponding to the addition request is stored in the supply management logical volume 60 (S4). On the other hand, the supply sub-manager section 40 carries out update processing of the digital content data 820 (S5). For example, the supply sub-manager section 40 registers the name of the newly added digital content in the first digital content sub-data 820A, and it prepares new second digital content sub-data 820B corresponding to the digital content and registers a pointer to this new second digital content sub-data 820B in the first digital content sub-data 820A. Furthermore, for example, the supply sub-manager section 40 takes all of the computer names registered in the sub-manager composition information 600 (or computer names selected by the user from same), and registers them in the newly prepared second digital content sub-data 820B. Thereby, the destination computers are established for the digital content newly registered in the supply management logical volume 60. In this case, for example, at least one of the supply sub-manager section 40 and the sub-manager storage management section 41 may report the name of the newly registered digital content, to the destination computers thus established. Furthermore, the supply sub-manager section 40 may report the storage data path name of the newly added digital content to the sub-manager storage management section 41, and the sub-manager storage management section 41 may add this storage data path name to the storage data path information 803.

The sub-manager storage management section 41 receives a request to delete digital content, via the supply sub-manager section 40 or the client screen (S6). In this case, the sub-manager storage management section 41 accesses the supply management logical volume 60 and deletes the digital content corresponding to the deletion request from the supply management logical volume 60 (S7). On the other hand, the supply sub-manager section 40 updates the digital content data 820 (S8). For example, the supply sub-manager section 40 deletes the name of the deleted digital content from the first digital content sub-data 820A, and it also deletes the second digital content sub-data 820B corresponding to that digital content. In this case, for example, at least one of the supply sub-manager section 40 and the sub-manager storage management section 41 may report the name of the digital content thus deleted, to the respective supply destination computers registered in the deleted second digital content sub-data 820B. Moreover, the supply sub-manager section 40 may report the name of the deleted digital content to the sub-manager storage management section 41, and the sub-manager storage management section 41 may delete the storage data path name corresponding to this name, from the storage data path name information 803.

The sub-manager storage management section 41 may receive a request to supply the digital content, via the supply sub-manager section 40 or the client screen (S9). In this case, the sub-manager storage management section 41 pairs the supply management logical volume 60 with one or more of the business use logical volumes 61, and it executes copy processing for copying the digital content in the supply management logical volume 60, to the business use logical volumes 61 (S10).

If the supply sub-manager section 40 receives an addition event or a deletion event for a business computer 21 or a virtual computer 50 (S11), then it carries out management processing of the sub-manager composition information 600 (S12).

If the sub-management computer 20 receives a termination request via the client screen, for example (S13), then it sets the internal flag to 1 and terminates the processing sequence.

Figure 15:
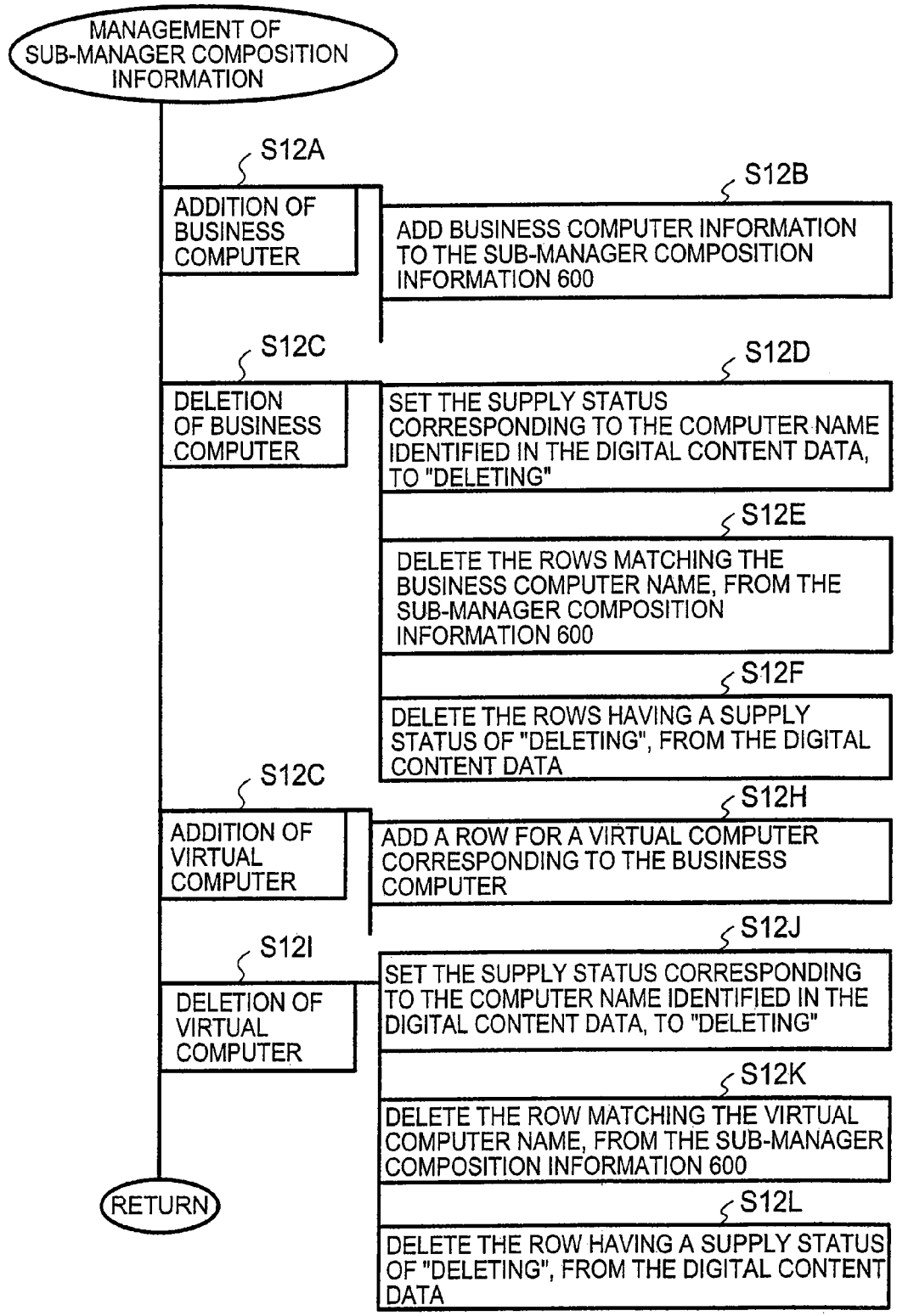
FIG. 15 shows a concrete example of the processing in S12 in FIG. 14.

FIG. 15 shows a concrete example of the processing in Storage system 12 in FIG. 14.

If a new business computer 21 is connected to the SAN 9 or the TCP/IP network 2, then the supply sub-manager section 40 detects the addition of the business computer 21, for example, by receiving business computer information relating to the business computer 21 (for example, information containing the business computer name and the business computer address), from the business computer 21, via the TCP/IP network 2 (S12A). In this case, the supply sub-manager section 40 adds the business computer information thus received to the sub-manager composition information 600 (S12B). Moreover, in this case, the supply sub-manager section 40 may register the business computer name contained in this business computer information, in each of the respective second digital content sub-data 820B.

If the supply sub-manager section 40 has received a business computer deletion request from the user via the client screen, for example, or if there is no response of any kind from a business computer 21 that is supposed to be connected to the SAN 9 or the TCP/IP network 2, then it detects deletion of the business computer 21 (S12C). In this case, the supply sub-manager section 40 identifies the business computer name of the detected business computer 21, and it updates the supply status corresponding to the identified computer name as registered in the respective second digital content sub-data 820B to "deleting" (S12D). Furthermore, the supply sub-manager section 40 also deletes the rows relating to the identified computer name from the sub-manager composition information 600 (S12E). More specifically, if the identified computer name is "Tokyo1", for example, then the supply sub-manager section 40 deletes all of the rows 601-603 containing that computer name (see FIG. 8). The supply sub-manager section 40 then deletes the rows having a supply status of "deleting", from the respective second digital content sub-data 820B (S12F). By means of the foregoing processing, the information relating to the business computer 21 is deleted from the sub-management computer 20.

When a new virtual computer 50 is generated in a business computer 21, then the supply sub-manager section 40 detects the addition of the virtual computer 50 by, for example, receiving virtual computer information relating to that virtual computer 50 (such as information containing the virtual computer name, the virtual computer address, and the name and address of the business computer containing that virtual computer), from the virtual computer management section 51, via the TCP/IP network 2 (S12G). In this case, the supply sub-manager section 40 adds the virtual computer information thus received to the sub-manager composition information 600 and it sets the virtual computer flag in the row where this virtual computer information has been added, to 1 (S12H). Furthermore, in this case, the supply sub-manager section 40 may register the virtual computer name contained in the added virtual computer information, in each of the second digital content sub-data 820B.

If the supply sub-manager section 40 receives a virtual computer deletion request from the user via the client screen, for example, or if it receives a deletion report for a virtual computer 50 from any of the business computers 21, via the TCP/IP network 2, then it proceeds to identify the virtual computer name (or address) of the virtual computer that is to be deleted (S12I). In this case, the supply sub-manager section 40 updates the supply status corresponding to the identified computer name, as registered in each of the second digital content sub-data 820B, to "deleting" (S12J). Furthermore, the supply sub-manager section 40 deletes the row relating to the identified computer name from the sub-manager composition information 600 (S12K). More specifically, if the identified computer name is "Tokyo1-2", for example, then the supply sub-manager section 40 deletes row 603, which contains that computer name (see FIG. 8). The supply sub-manager section 40 deletes the row containing the supply status "deleting" from the respective second digital content sub-data 820B (S12L).

By means of processing such as that described above, business computers 21 or virtual computers 50 that are added or deleted are managed in the sub-management computer 20.

Figure 16:
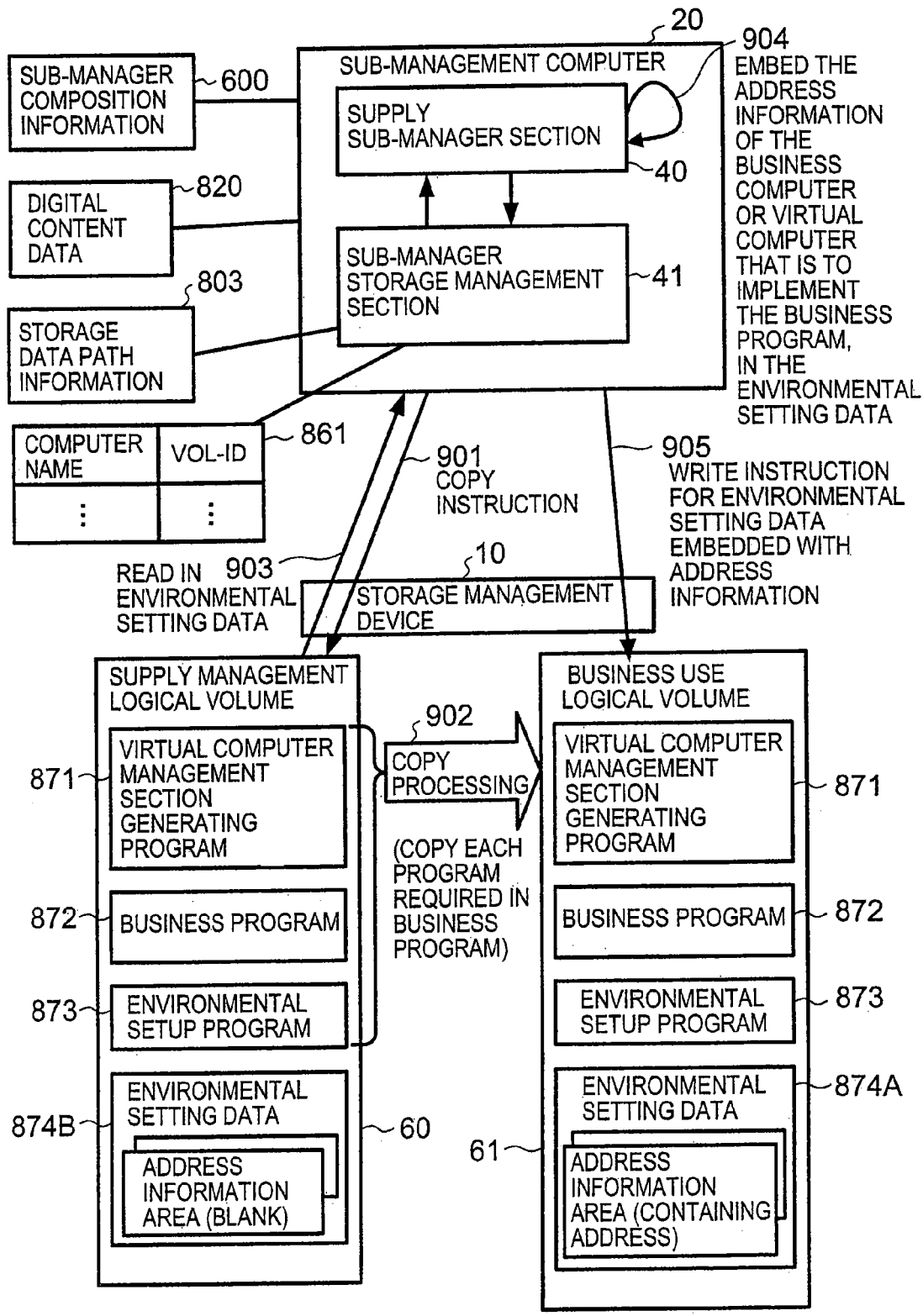
FIG. 16 shows an overview of the copy processing in S10 in FIG. 14.

FIG. 16 shows an overview of the copy processing in S10 in FIG. 14.

Volume information 861 is provided in the storage device (for example the memory) (not illustrated) inside the sub-management computer 20. The volume information 861 registers the logical volume IDs corresponding respectively to a plurality of computer names, for example (rather than the computer names, these may also be other types of computer ID, such as computer addresses). When a business computer 21 has been added, for example, the sub-manager storage management section 41 can add a new business use logical volume 61 corresponding to that business computer 21, to the storage area 11, and add the name and logical volume ID of the added business computer 21 to the volume information 861. Furthermore, if a business computer 21 has been deleted, for example, then the sub-manager storage management section 41 can delete the business use logical volume 61 corresponding to that business computer 21, from the storage area 11, and delete the name and logical volume ID of the deleted business computer 21 from the volume information 861.

The supply management logical volume 60 stores digital content, such as a virtual computer management section generating program 871, a business program 872, an environmental setup program 873 and environmental setting data 874B, for example. The environmental setting data 874B comprises one or a plurality of address information areas. The address information area of the environmental setting data 874B may be blank, for example.

Below, an overview of the flow of copy processing is described.

As shown by the arrow 901, the sub-manager storage management section 41 issues a copy instruction to the storage management device 10 for copying the virtual computer management section generating program 871, business program 872 and environmental setup program 873 in the supply management logical volume 60, to a business use logical volume 61. In accordance with this copy instruction, the storage management device 10 copies the virtual computer management section generating program 871, the business program 872 and the environmental setup program 873 in the supply management logical volume 60, to the business use logical volume 61, as indicated by arrow 902.

Thereupon, as indicated by the arrow 903, the sub-manager storage management section 41 reads in the environmental setting data 874B from the supply management logical volume 60.

The supply sub-manager section 40 identifies the name of the computer corresponding to the ID of the business use logical volume 61 to which the digital content is to be copied, from the volume information 861, and it identifies the business computer address or the virtual computer address corresponding to the identified computer name, from the sub-manager composition information 600. As indicated by arrow 904, the supply sub-manager section 40 embeds the business computer address or the virtual computer address thus identified into the address information area of the environmental setting data 874B read out as described above.

The sub-manager storage management section 41 then writes the environmental setting data 874B whose address information area is embedded with the business computer address or the virtual computer address, to the business use logical volume 61 forming the copy destination, as indicated by the arrow 905.

By means of the processing sequence described above, digital content is stored in the business use logical volume 61. It may be devised that the agent storage management section 52 of the business computer 21 corresponding to the business use logical volume 61 forming the copy destination, or of the virtual computer 50 provided in that business computer 21, only reads out the digital content in the business use logical volume 61 if the business computer address or the virtual computer address has been established in the environmental setting data in that business use logical volume 61. If this address has not been established, then the digital content is not read out, even if it is stored in the business use logical volume 61.

Below, the sequence of the copy processing is described in detail.

Figure 17:
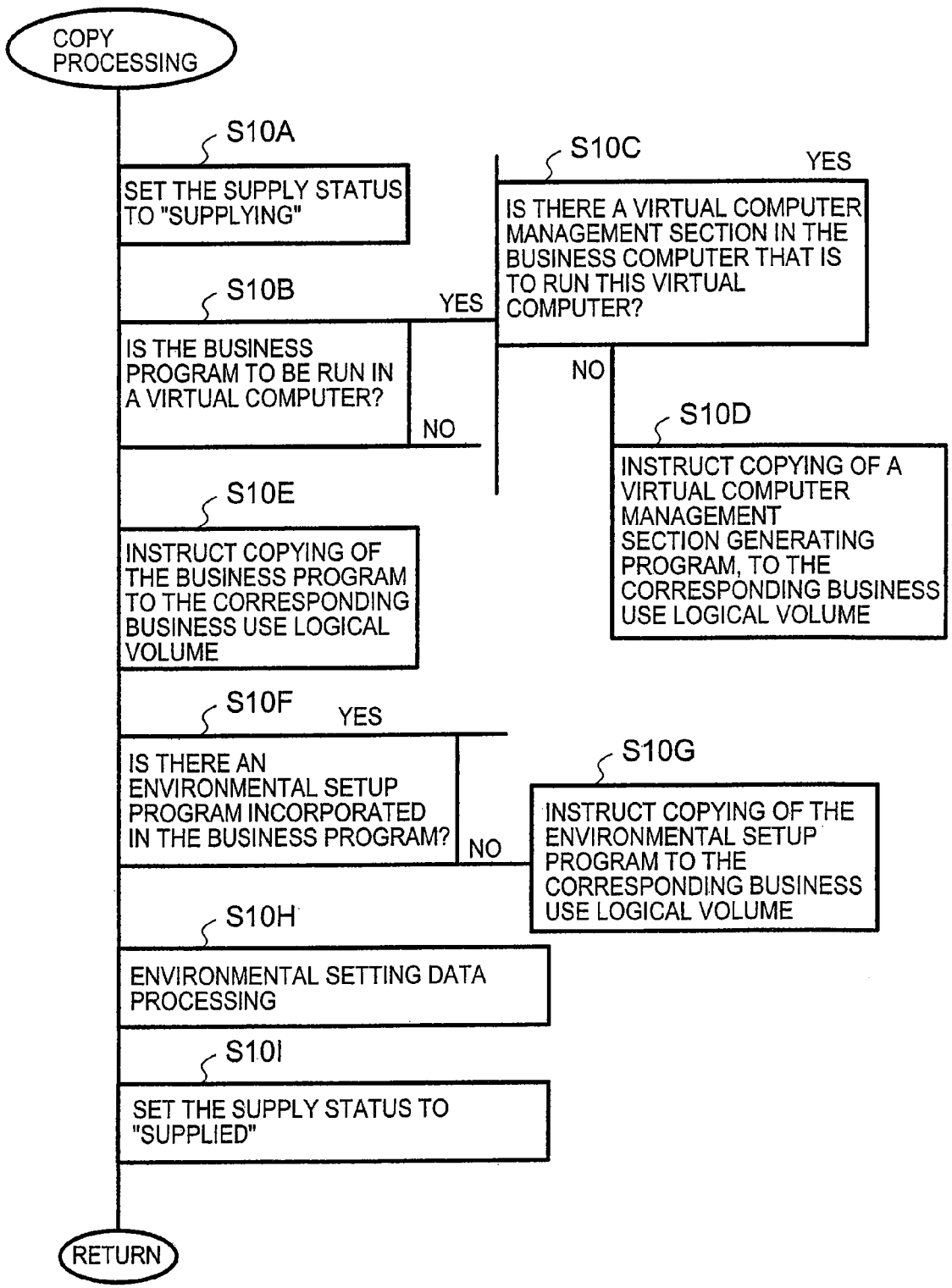
FIG. 17 shows a concrete example of a processing sequence in the sub-management computer 20 when performing copy processing.

FIG. 17 shows a concrete example of a processing sequence in the sub-management computer 20 when carrying out copy processing.

The supply sub-manager section 40 identifies the business computer name corresponding to the business use logical volume 61 forming the copy destination, and on the basis of this name, it identifies the name of the virtual computer present in that business computer, from the sub-manager composition information 600. The supply sub-manager section 40 searches for the business computer name or the virtual computer name thus identified in the second digital content sub-data corresponding to the respective digital content components to be copied, and it updates the supply status corresponding to the name thus found, to "supplying" (S10A).

If a business program (a computer program for performing a particular business task) 872 is to be implemented in a virtual computer 50 (Yes at S10B), then the supply sub-manager section 40 investigates whether or not there exists a virtual computer management section 51 in the business computer 21 running this virtual computer 50 (S10C). This can be carried out by means of the supply sub-manager section 40 receiving a program composition report from the business computer 21, via the TCP/IP network 2 (such as a report indicating which of the computer programs has been installed in the business computer 21, for example). If a negative result is obtained at S10C (No at S10C), then the supply sub-manager section 40 causes the sub-manager storage management section 41 to issue a copy instruction to the storage management device 10 in order to copy the virtual computer management section generating program 871 to the business use logical volume 61 (S10D).

Furthermore, the supply sub-manager section 40 causes the sub-manager storage management section 41 to issue a copy instruction to the storage management device 10 in order to copy the business program 872 to the business use logical volume 61 (S10E).

Furthermore, if the environmental setup program 873 is not incorporated in the business program 872 (No at S10F), then the supply sub-manager section 40 issues a copy instruction to the storage management device 10, in order to copy the environmental setup program 873 to the business use logical volume 61 (S10G). It can be determined whether or not an environmental setup program 873 is incorporated in a business program 872 by, for example, providing flags indicating whether or not an environmental setup program 873 is incorporated in each of the business programs 872, in the first digital content sub-data 820A, and then having the supply sub-manager section 40 refer to the flags and check whether or not they are raised.

When the supply sub-manager section 40 has carried out processing related to the environmental setting data (S10H), it updates the supply status in the respective second digital content sub-data, which was set to "supplying" at S10A, and changes this status to "supplied" (S10I).

Figure 18:
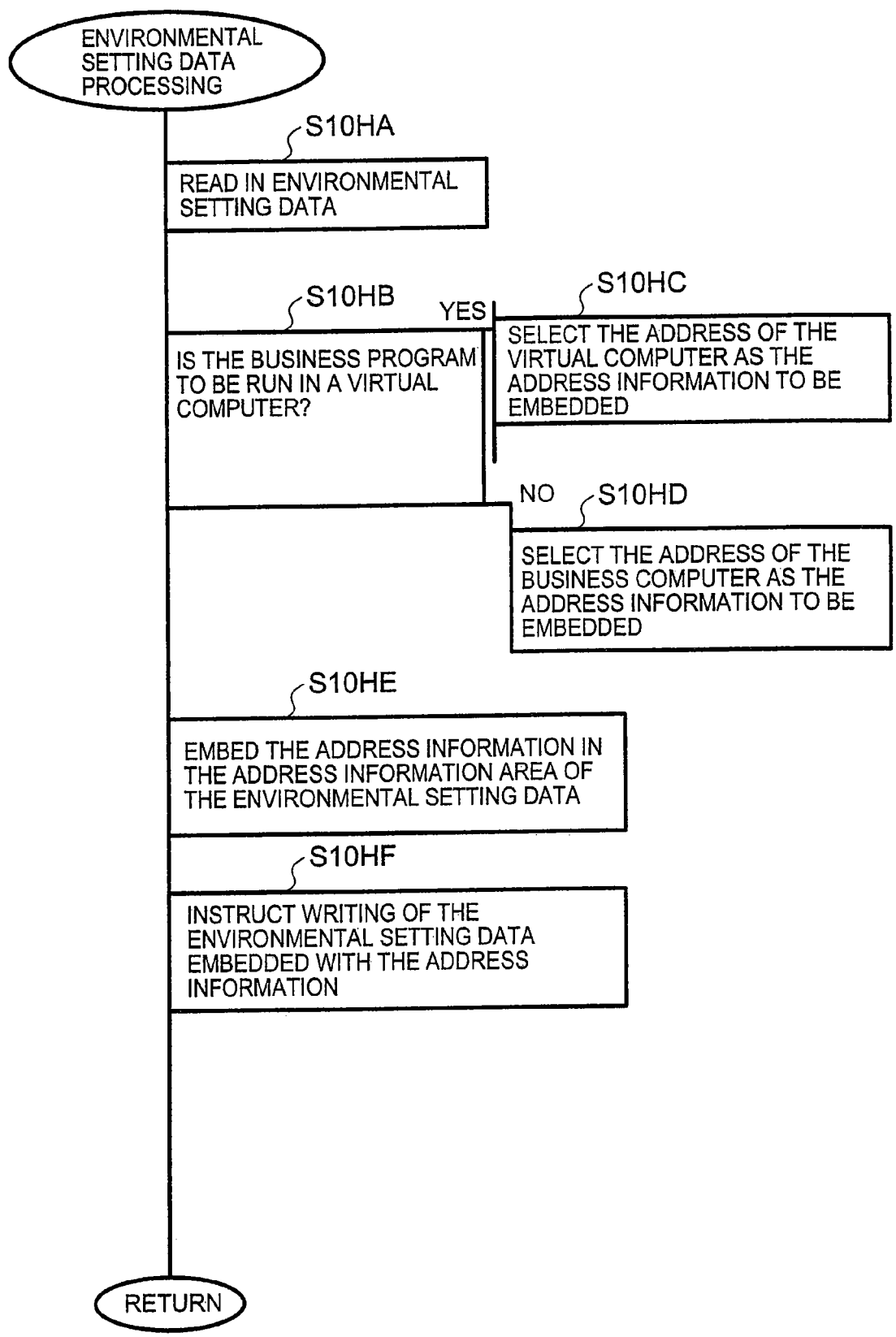
FIG. 18 shows one example of the sequence of environmental setting data processing in S10H in FIG. 17.

FIG. 18 shows one example of the sequence of environmental setting data processing in S10H in FIG. 17.

The supply sub-manager section 40 reports the name of the environmental setting data to be read in, to the sub-manager storage management section 41, and the sub-manager storage management section 41 identifies the storage data path name corresponding to the reported name, from the storage data path information 803. It then reads in environmental setting data on the basis of this storage data path name, from the supply management logical volume 60 (S10HA). The environmental setting data thus read in is registered in the memory, for example.

If the business program 872 is to be implemented in a virtual computer (for example, the virtual computer having the name "Tokyo1-1") (Yes at S10HB), then the supply sub-manager section 40 selects the address of that virtual computer as address information for writing into the address information area of the environmental setting data (S10HC). If, on the other hand, the business program 872 is to be implemented in a business computer (for example, the business computer having the name "Tokyo1") (No at S10HB), then the supply sub-manager section 40 selects the address of that business computer as address information to be embedded in the address information area of the environmental setting data (S10HD).

The supply sub-manager section 40 embeds the address selected at S10HC or S10HD in the address information area of the environmental setting data recorded in the memory (S10HE). The supply sub-manager section 40 causes the sub-manager storage management section 41 to write the environmental setting data containing the address embedded at S10HC or S10HD, to the business use logical volume 61 forming the copy destination (S10HF).

Figure 19:
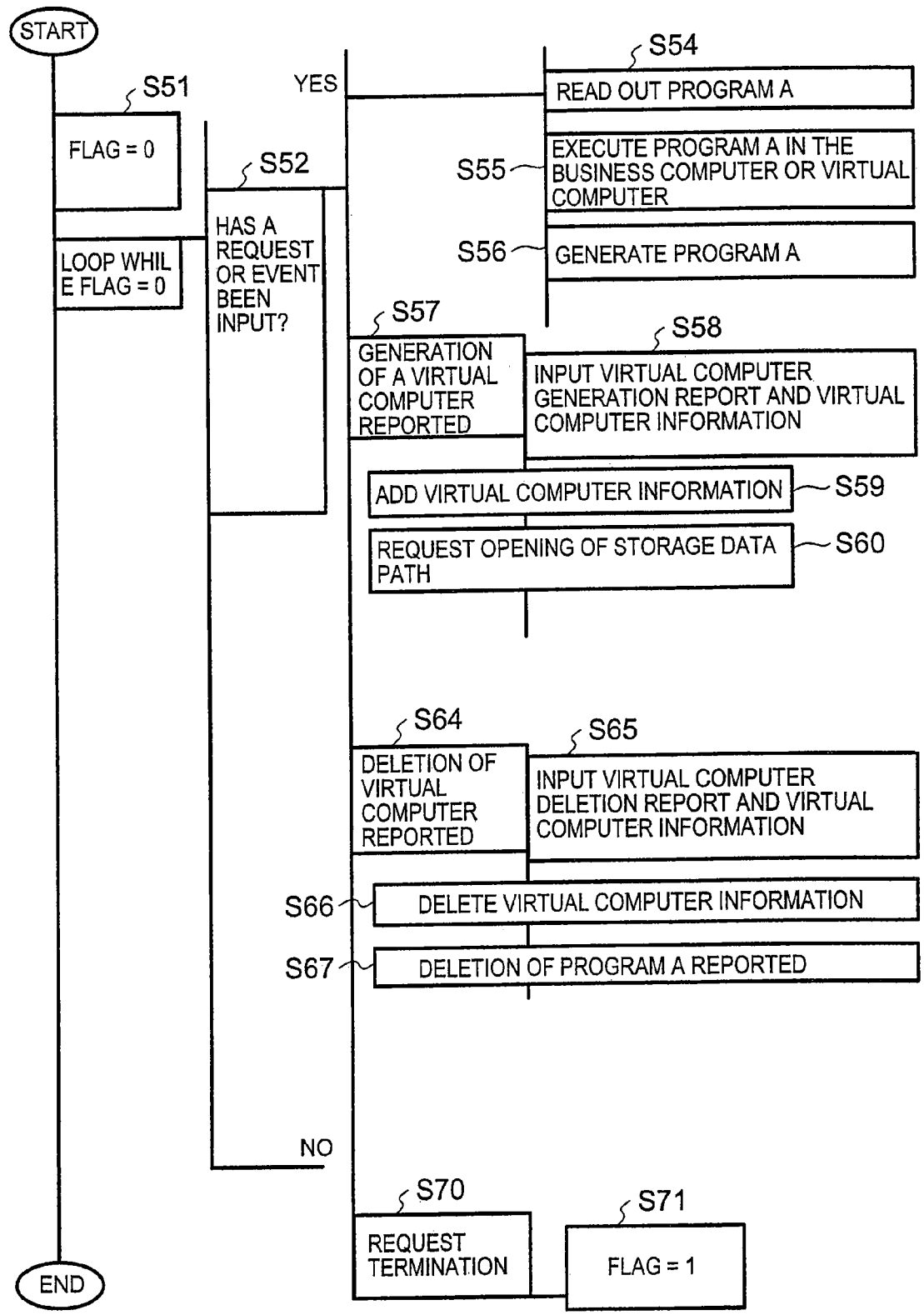
FIG. 19 shows one example of a processing sequence carried out by the agent storage management section 52.

FIG. 19 shows one example of the sequence of the processing carried out by the agent storage management section 52.

If the internal flag is set to zero (S51), and a prescribed request or event is input (Yes at S52), then the agent storage management section 52 carries out the following processing.

As indicated by arrow 500 in FIG. 12 or FIG. 13, for example, the agent storage management section 52 receives a program generation request containing an opened storage data path name, from the sub-management computer 20 (S53). In this case, as indicated by the arrow 501 in FIG. 12 or FIG. 13, the agent storage management section 52 reads out the program a (business program) 130 from the business use logical volume 61 corresponding to the business computer 21 (or the virtual computer 50) in which it is installed, for example, in accordance with the storage data path name (S54). In accordance with the aforementioned program generation request, the agent storage management section 52 then executes an installation program (not illustrated) contained in the program a (business program) 130 that has been read out (S55). Thereby, the program a (business program) 130 is generated inside the business computer 21 or the virtual computer 50 (S56).

As indicated by the arrow 302 in FIG. 10, the agent storage management section 52 may receive a report indicating that a new virtual computer has been generated, and virtual computer information relating to that virtual computer (for example, the virtual computer name, identifier, and virtual computer address) from the virtual computer management section 51 (S57, S58). In this case, the agent storage management section 52 registers the received virtual computer information in the virtual computer management table 840 such as that illustrated in FIG. 11 (S59). Furthermore, the agent storage management section 52 requests the sub-manager storage management section 41 to open a storage data path name for the program a 130 to be supplied to the newly generated virtual computer, as indicated by the arrow 121 in FIG. 5 (S60).

As indicated by the arrow 402 in FIG. 10, the agent storage management section 52 may also receive a report indicating that a virtual computer has been deleted, and virtual computer information relating to that virtual computer (such as the virtual computer name, identifier, and virtual computer address), from the virtual computer management section 51 (S64, S65). In this case, the agent storage management section 52 deletes the received virtual computer information from the virtual computer management table 840 such as that illustrated in FIG. 11 (S66). Furthermore, if a business program was installed in the virtual computer that has been deleted, then the agent storage management section 52 reports that that business program has been deleted, together with the name, and the like, of the business program, to the supply sub-manager section 40 (S67).

If the agent storage management section 52 receives a termination request based on a command from the user, for example (S70), then it sets the internal flag to 1 and terminates processing (S71).

Figure 20:
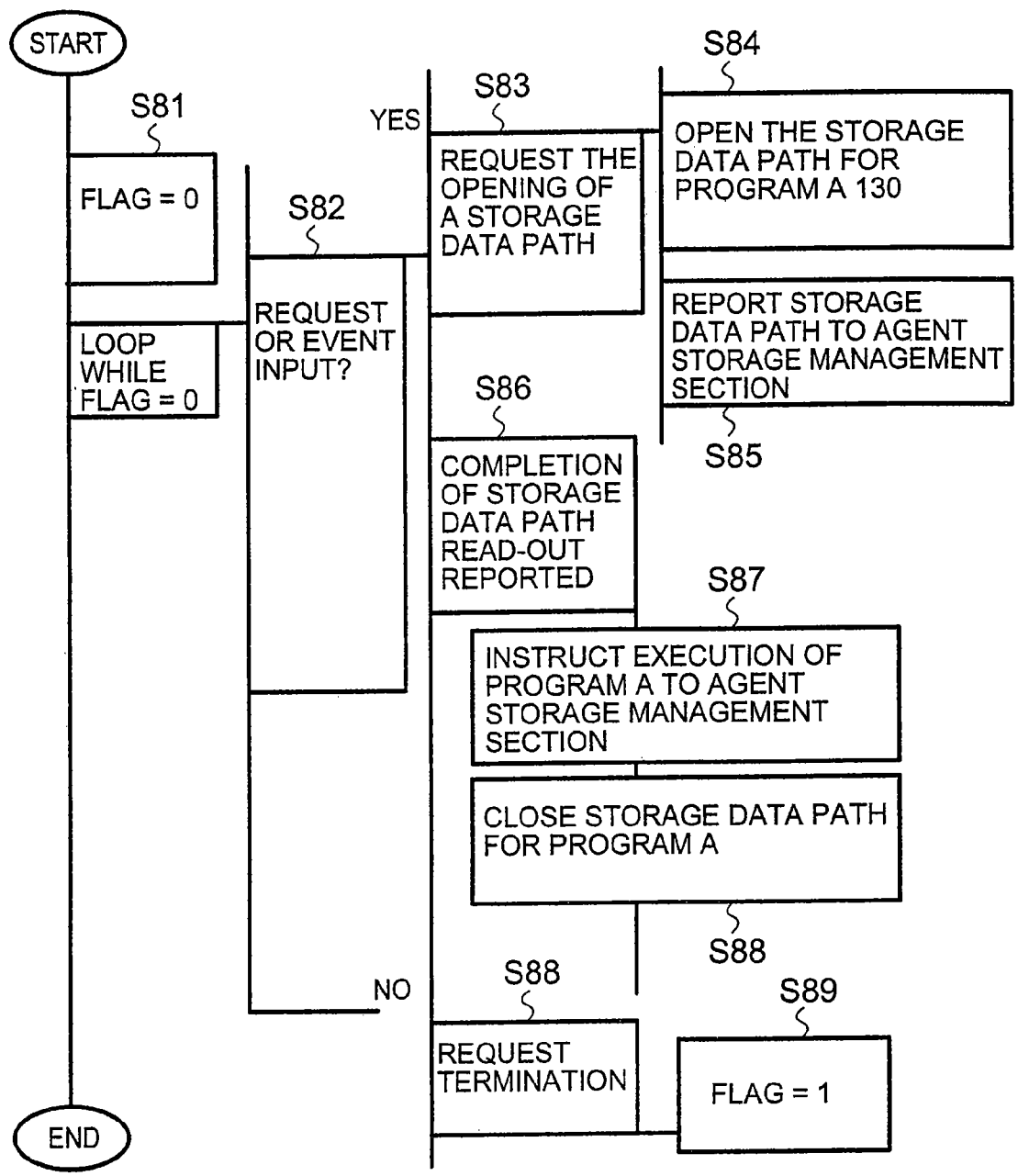
FIG. 20 shows one example of a processing sequence carried out by the virtual computer management section 51.

FIG. 20 shows one example of the processing sequence performed by the sub-manager storage management section 41.

If the internal flag is zero (S81) and a prescribed request or event is input (Yes at S82), then the sub-manager storage management section 41 carries out the following processing, for example.

As indicated by arrow 121 in FIG. 5, for example, the sub-manager storage management section 41 receives a storage data path opening request from the agent storage management section 52 (S83). In this case, the sub-manager storage management section 41 acquires and opens a storage data path name for the digital content (for example, program a 130) corresponding to that request, from the storage data path information (S84). The sub-manager storage management section 41 then reports the opened storage data path name to the agent storage management section 52 (S85).

Furthermore, as indicated by the arrow 121 in FIG. 5, for example, the sub-manager storage management section 41 receives a storage data path read-out completion report from the agent storage management section 52 (S86). In this case, for example, the sub-manager storage management section 41 instructs the agent storage management section 52 to execute the digital content (such as the program a 130) corresponding to that request (S87). The sub-manager storage management section 41 then closes the storage data path name of that digital content (in other words, the storage data path name that had been opened) (S88).

The sub-manager storage management section 41 may receive a terminal request via the client screen, for example (S88), whereupon it sets the internal flag to 1 and terminates processing (S89).

Figure 21:
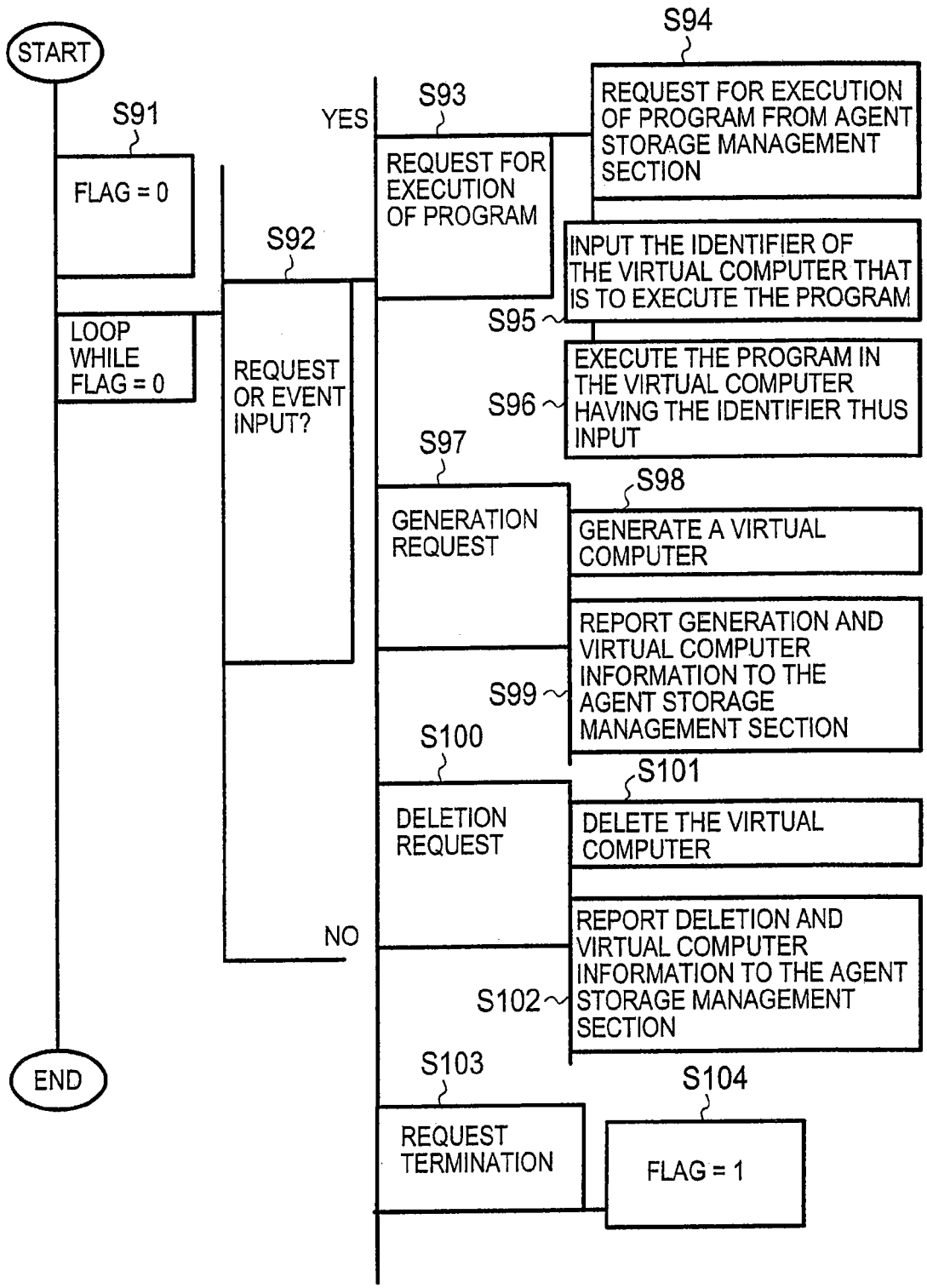
FIG. 21 shows one example of a processing sequence carried out by the virtual computer management section 51.

FIG. 21 shows one example of a processing sequence carried out by the virtual computer management section 51.

If the internal flag is zero (S91) and a prescribed request or event has been input (Yes at S92), then the virtual computer management section 51 carries out the following processing, for example.

If, for instance, there has been a request from the agent storage management section 52 for execution of the program a (business program) 130 that has been read out (S93, S94), then the virtual computer management section 51 inputs the identifier of the virtual computer executing that program a 130 (S95). The virtual computer management section 51 executes the installation program (not illustrated) contained in the program a (business program) 130, inside the virtual computer having the identifier thus input (S96). Thereby, the program a (business program) 130 is generated within the virtual computer 50.

If the virtual computer management section 51 receives a virtual computer generation request (S97), then in response to this request, it generates a new virtual computer, as indicated by arrow 301 in FIG. 10 (S98). Furthermore, in this case, the virtual computer management section 51 sends a report indicating that a new virtual computer has been generated, and virtual computer information relating to that virtual computer (for example, the virtual computer name, identifier and virtual computer address), to the agent storage management section 52, as indicated by arrow 302 (S99).

If the virtual computer management section 51 receives a virtual computer deletion request (S100), then in response to that request, it deletes the virtual computer, as indicated by arrow 401 in FIG. 10 (S101). Furthermore, in this case, the virtual computer management section 51 sends a report indicating that the virtual computer has been deleted, and virtual computer information relating to this virtual computer, to the agent storage management section 52, as indicated by the arrow 402 (S102).

If the virtual computer management section 51 receives a termination request based on a command from the user, for example (S103), then it sets the internal flag to 1 and terminates (S104).

According to the foregoing description, digital content is supplied to a business computer 21 or a virtual computer 50 by means of a so-called "pull" method, wherein digital content stored in a storage area 11 is read out from the storage area 11 by the business computer 21, in accordance with a storage data path name opened by the sub-management computer 20. However, instead of a "pull" method, it is also possible to supply information to a business computer 21 or a virtual computer 50 by means of a so-called "push" method, wherein the storage system 12 supplies the digital content to the business computer 21 or virtual computer 50. Below a case where information is supplied by a "push" method will be described.

Figure 22:
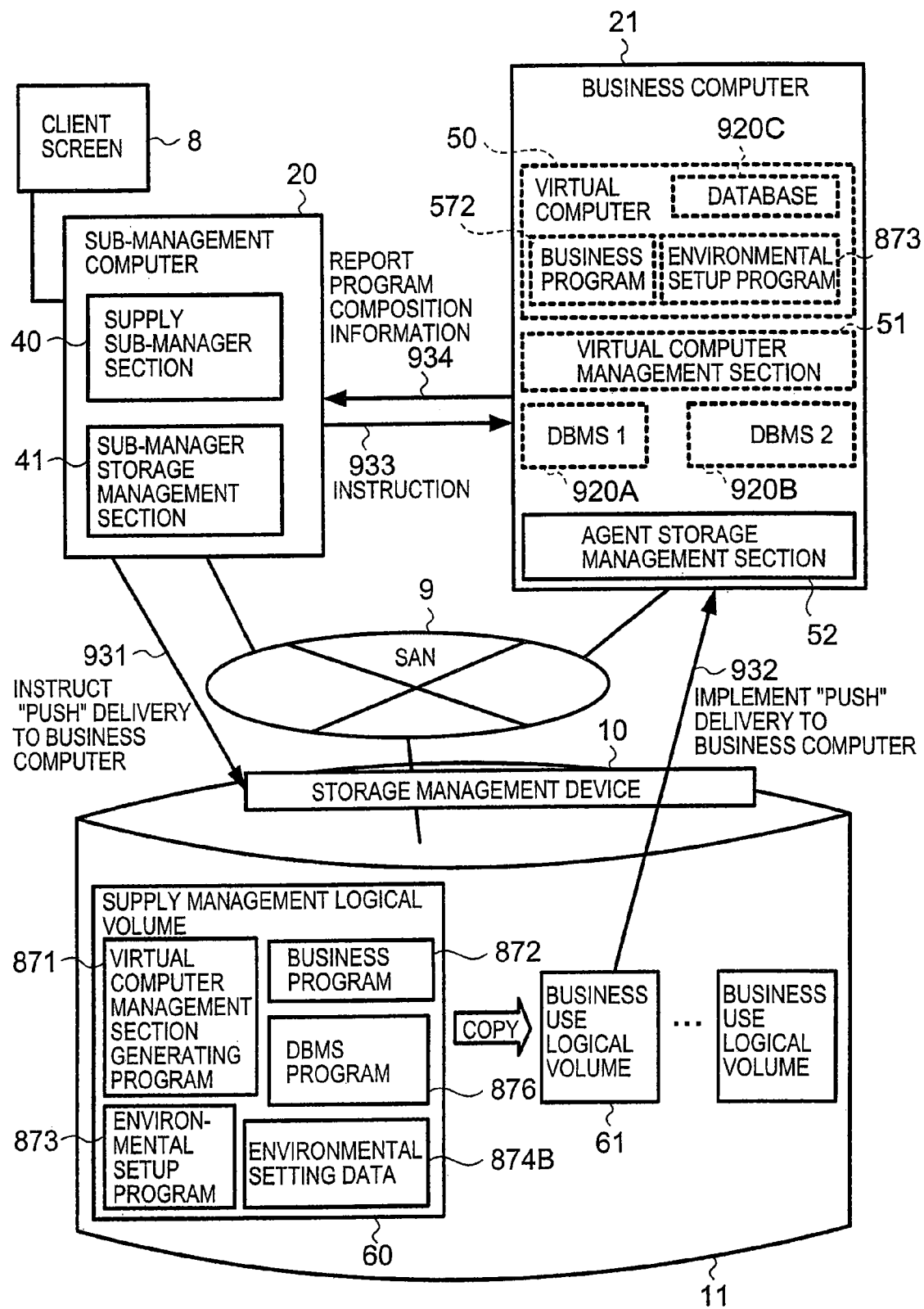
FIG. 22 shows one example of an overview of a system wherein digital content is supplied by a "push" method.

FIG. 22 shows one example of a general overview of a system where digital content is supplied using a "push" method.

A virtual computer management section generating program 871, a business program 872, an environmental setup program 873, environmental setting data 874B and a DBMS program 876 for generating a database management system (hereinafter, DBMS) are stored in the supply management logical volume 60, for example.

As indicated by arrow 931, the sub-manager storage management section 41 issues a push supply instruction to the storage system 12, in order that the information inside the supply management logical volume 60 is supplied to a business computer 21 or virtual computer 50 selected by the supply sub-manager section 40.

As indicated by arrow 932, in response to this instruction, the storage system 12 supplies the information in the supply management logical volume 60 to the business computer 21 or virtual computer 50.

Moreover, as indicated by arrow 933, the sub-manager storage management section 41 issues a program execution instruction to the agent storage management section 52. Thereby, for example, processing for installing the virtual computer management section generating program 871, the business program 872, the environmental setup program 873 and the DBMS program 876 is executed in the business computer 21, and a program composition such as that shown in the diagram is constructed in the business computer 21. In other words, two DBMS 920A and 920B, and a virtual computer management section 51 are constructed inside the business computer 21, for example. Furthermore, a database 920C, a business program 572 and an environmental setup program 873 are generated inside the virtual computer 50 in the business computer 21. The business computer 21 reports information relating to the program composition inside the business computer 21 (for instance, information indicating which programs are present, and which resources are used by which programs), to the sub-management computer 20.

Examples such as the following can be devised for making shared use of the DBMS.

Figure 23:
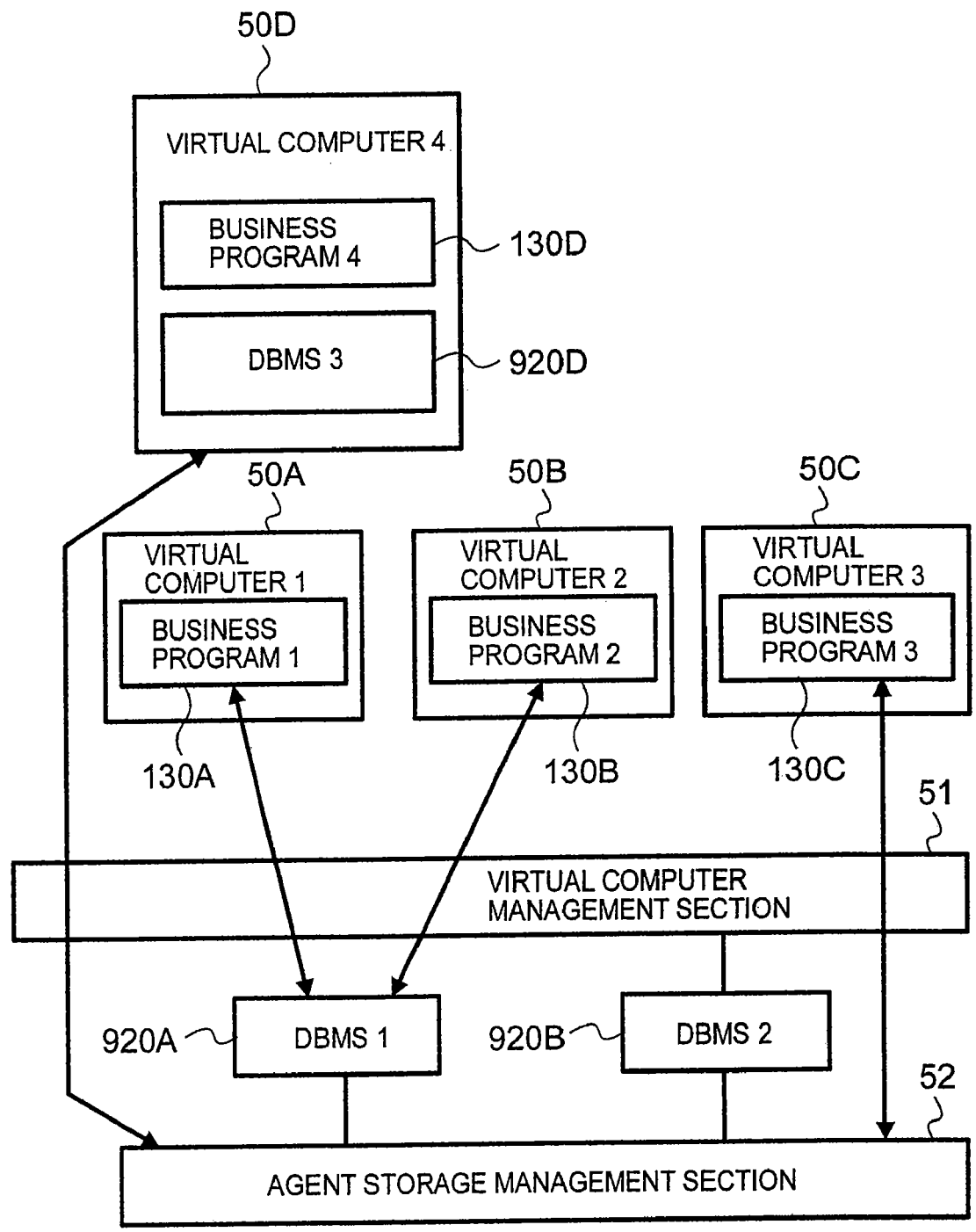
FIG. 23 shows an example of shared used of a DBMS.

FIG. 23 shows an example of shared use of the DBMS.

For example, a business program 130A generated in a virtual computer 50A, and a business program 130B generated in a virtual computer 50B share use of the DBMS 920A, but this DBMS is not installed in the virtual computers.

Furthermore, a business program 130C generated in a virtual computer 50C is business application software which does not use a DBMS.

A business program 130D generated in a virtual computer 50D uses a DBMS 920D, and this DBMS 920D is installed in the virtual computer 50D.

In this way, many different variations for the program composition can be envisaged. The type of program composition to be used inside each business computer 21 is determined on the basis of the type of environmental setting data contents to be supplied to that business computer 21. In other words, a program composition is constructed within a business computer 21 by the operation of the agent storage management section 52 and the virtual computer management section 51, on the basis of the environmental setting data supplied to that business computer 21, for example.

Below, a concrete example of the processing sequence in a case where information is supplied by means of a "push" method will be described.

Figure 24:
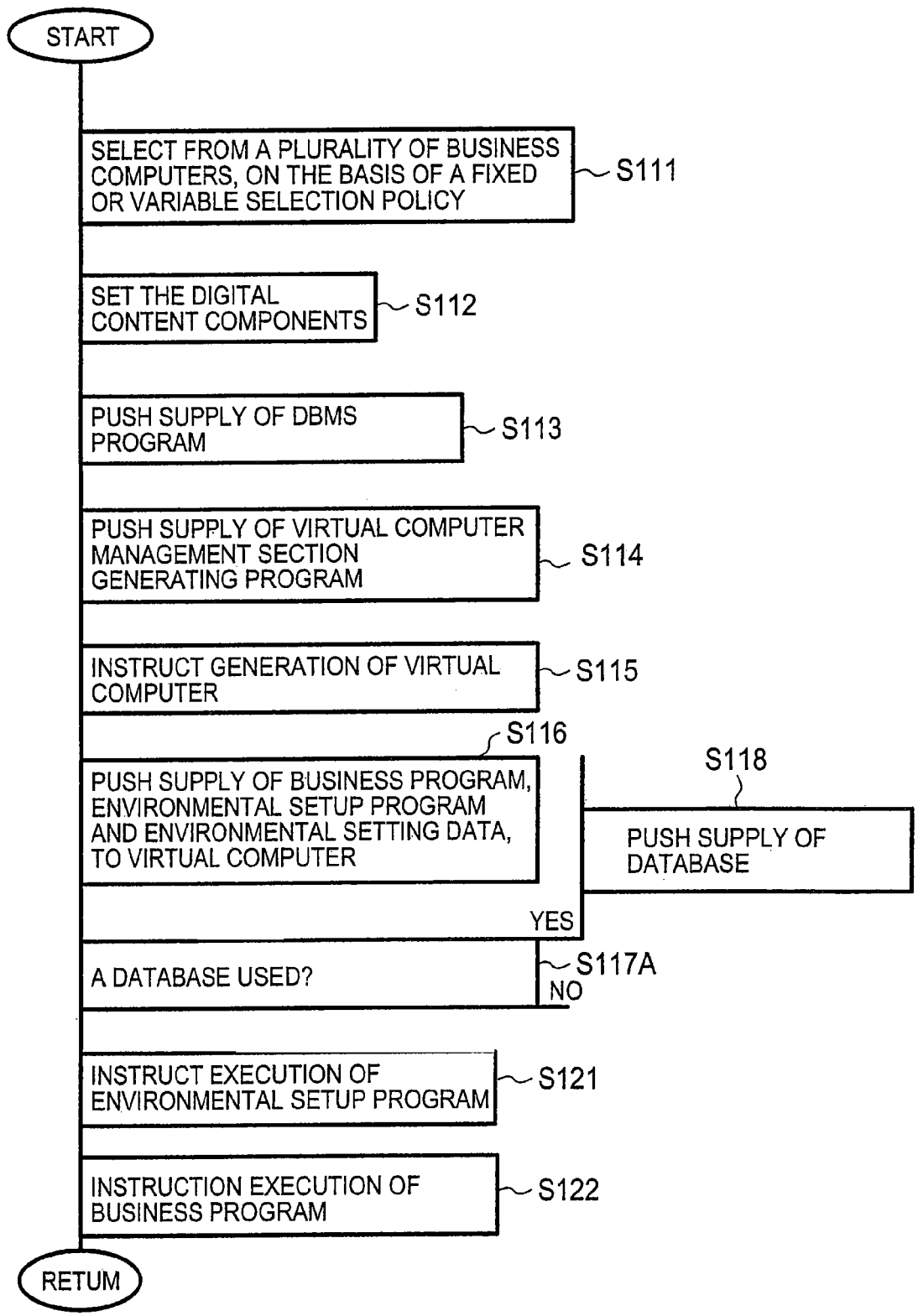
FIG. 24 shows one example of a processing sequence carried out when supplying digital content by a "push" method.

FIG. 24 shows one example of a processing sequence carried out in a case where information is supplied by a "push" method. In the following description "supply digital content by push supply" means that digital content is supplied to a desired destination, from the storage system 12.

The sub-management computer 20 selects the name of a business computer forming a supply destination, from the plurality of business computer names registered in the sub-manager composition information 600, on the basis of a selection policy (recorded in a memory, for instance), which may be fixed or variable (S111). The selection policy indicates, for example, whether shared use of the DBMS is prioritized or non-prioritized, and states the importance rating of each business computer. If shared use of the DBMS is prioritized, then the sub-management computer 20 selects a business computer having an importance higher than a prescribed rating.

Thereupon, the sub-management computer 20 selects a plurality of digital content names for which the name of the business computer selected at S111 has been registered as a supply destination, from the digital content data 820, and it sets the digital content components having these names as objects for supply (S112). The sub-management computer 20 copies the digital content components thus determined to the business use logical volume 61 of the business computer selected at S111.

Next, of the plurality of digital content components selected at S112, the sub-management computer 20 first supplies the DBMS program 876 to the business computer, by push supply, on the basis of the address corresponding to the business computer selected at S111 (S113). Thereupon, the sub-management computer 20 supplies the virtual computer management section generating program 871 to the business computer selected at S111, by push supply (S114).

Next, the sub-management computer 20 sends a virtual computer generation instruction to the business computer 21 selected at S111 (S115).

The sub-management computer 20 then writes the address of the newly generated virtual computer to the address information area of the environmental setting data 874B contained in the plurality of digital content components selected at S112.

Thereupon, the sub-management computer 20 supplies the digital content components having the newly generated virtual computer as a supply destination, by push supply, to that virtual computer. These digital content components are, for example, the business program 872, the environmental setup program 873 and the environmental setting data embedded with the address (S116).

Next, if the sub-management computer 20 has detected from the contents of the environmental setting data that a newly generated virtual computer is using the database (Yes at S117A), then it supplies the database (not illustrated) stored in the business use logical volume 61 (or the supply management logical volume 60) at the aforementioned copy destination, to the newly generated virtual computer 50, by push supply (S118).

Next, the sub-management computer 20 issues an execution instruction for the environmental setup program 873 and an execution instruction for the business program 872 supplied by push supply to the virtual computer, and it directs these instructions to the virtual computer management section 51 (S121, S122).

Figure 25:
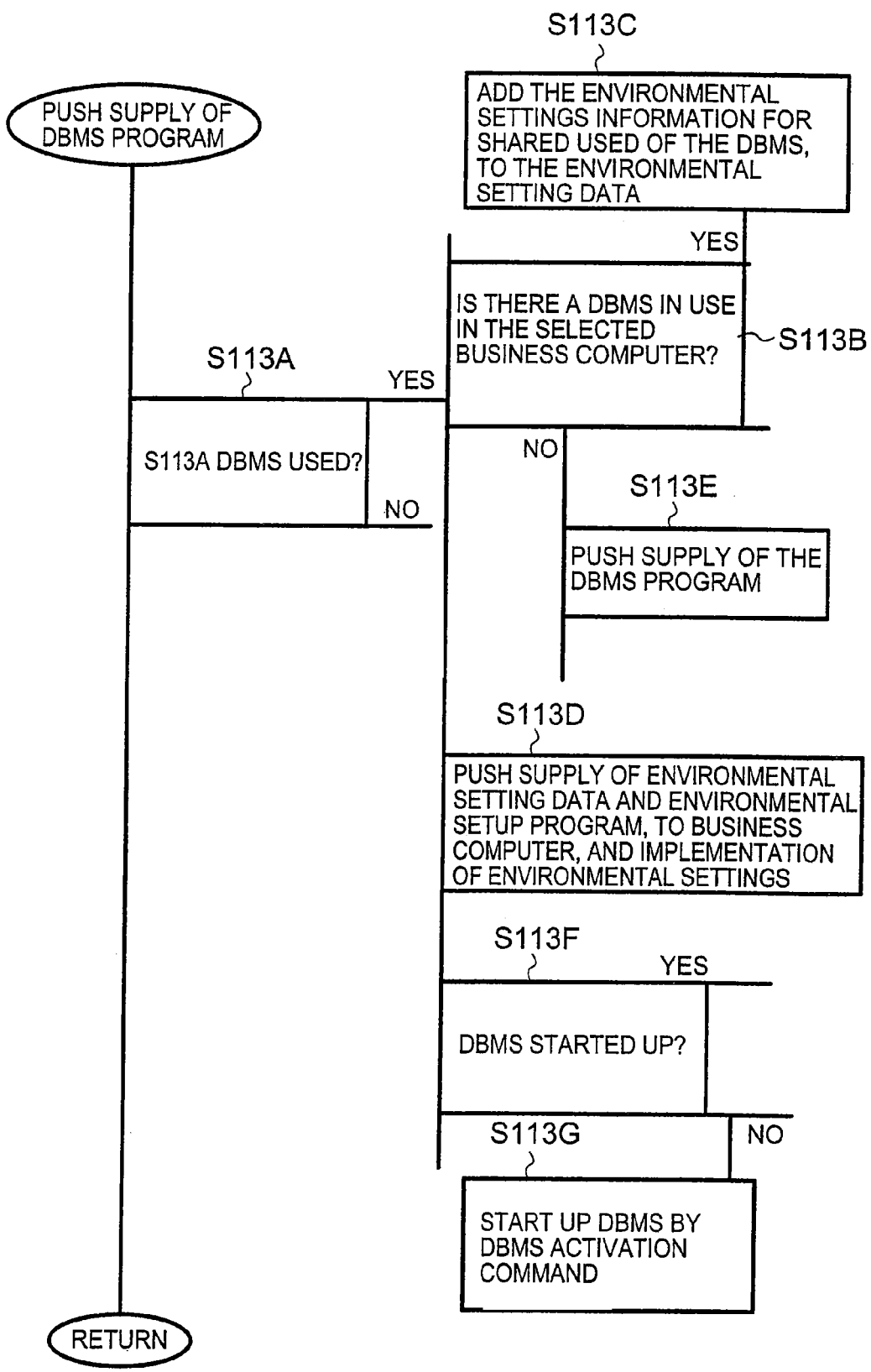
FIG. 25 shows an example of a concrete processing sequence carried out in S113 in FIG. 24.

FIG. 25 shows an example of the specific processing sequence carried out at S113 in FIG. 24.

If the DBMS is used by the business computer selected at S111, for example (Yes at S113A), then the following processing is carried out.

If the DBMS is already present in the business computer 21 (Yes at S113B), then the sub-management computer 20 adds environmental settings information for sharing use of the DBMS to the environmental setting data (S113C). If, on the other hand, no DBMS is present at S133B (No at S113B), then the DBMS program is supplied by push supply to the business computer (S113E).

The sub-management computer 20 supplies the environmental setup program 873 and the environmental setting data to the business computer selected at S111, by push supply, and executes environmental setup (S113D).

Furthermore, if the DBMS has not be started up (No at S113F), then the sub-management computer 20 commands the business computer 21 to start up the DBMS, and hence the DBMS program is initiated (S113G).

Figure 26:
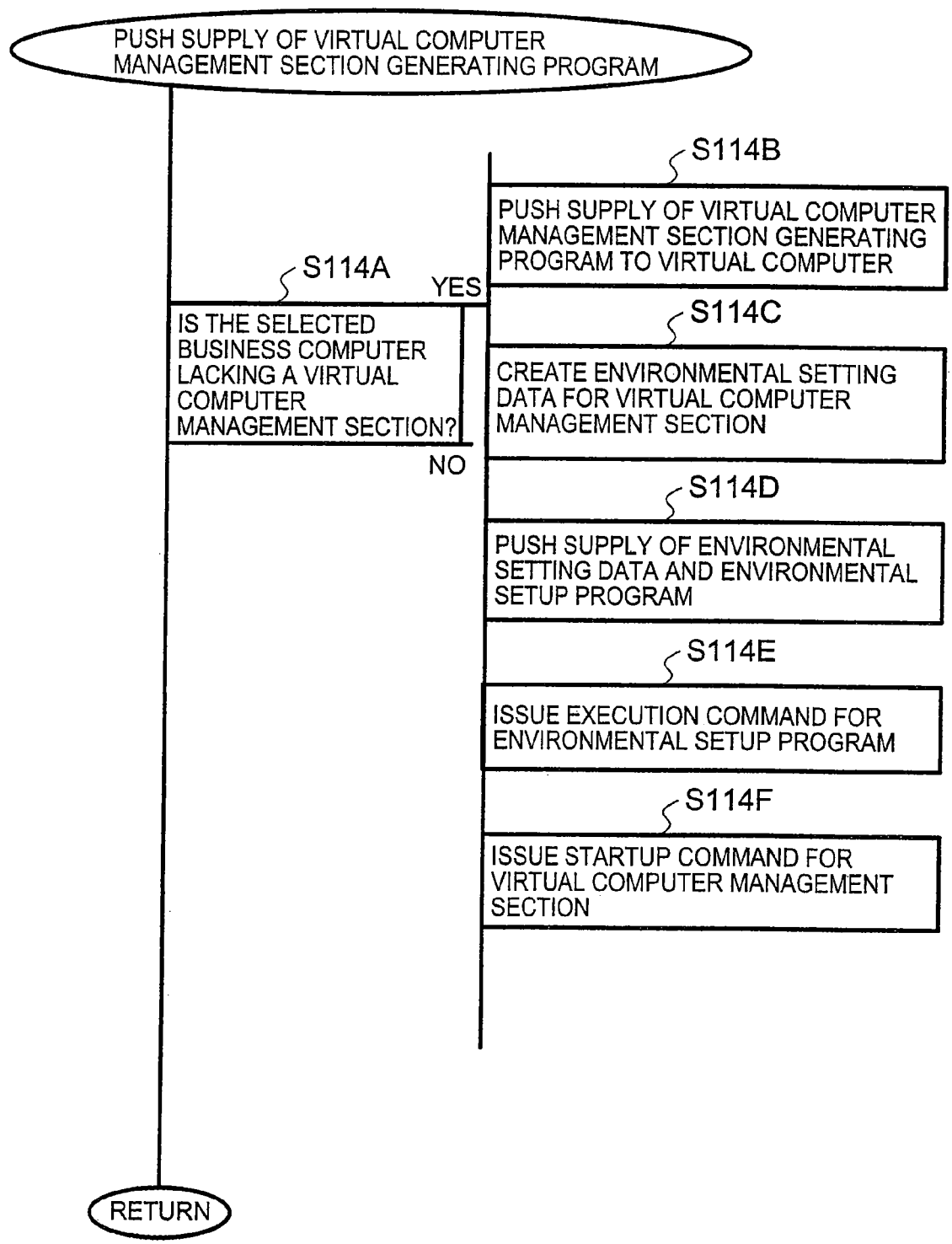
FIG. 26 shows an example of a concrete processing sequence carried out in S114 in FIG. 24.

FIG. 26 shows a concrete example of a processing sequence carried out in S114 in FIG. 24.

If the business computer selected at S111 is lacking a virtual computer management section 51, for example (Yes at S114A), then the sub-management computer 20 carries out the following processing, for instance.

The sub-management computer 20 supplies the virtual computer management section generating program 871 to the business computer selected at S111 by push supply (S114B).

The sub-management computer 20 creates environmental setting data for the virtual computer management section (S114C), and it supplies the environmental setting data thus created, and the environmental setup program, to the business computer selected at S111, by push supply (S114D). The sub-management computer 20 then issues an execution command for the environmental setup program to the business computer 21 (S114E), whereupon it also issues a startup instruction for the virtual computer management section (S114F).

The foregoing provided a description of the present embodiment. Below, an approximate description is given of the processing sequence implemented in the aforementioned embodiment. In the following description, the storage system may be a system that manages the digital content components in block units, or it may be a NAS (Network Attached Storage) system wherein the digital content components are managed in file units.

Figure 27:
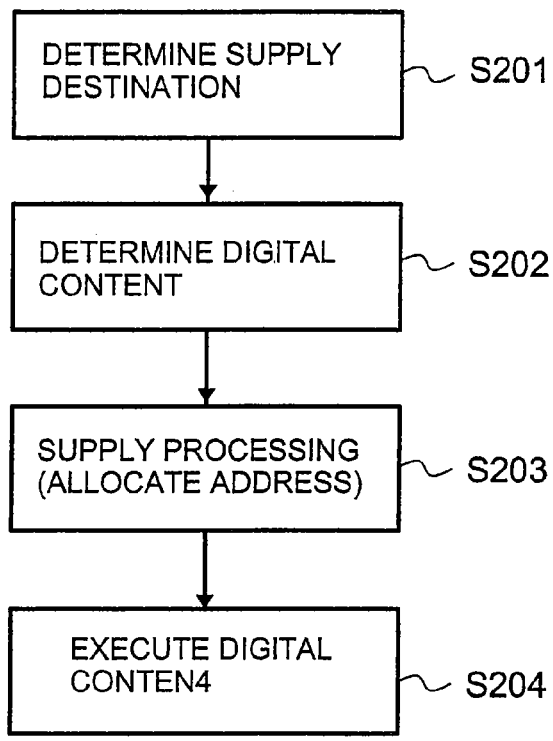
FIG. 27 shows an overview of a processing sequence carried out in one embodiment of the present invention.

FIG. 27 shows an overview of the sequence of processing carried out in the present embodiment.

The sub-management computer 20 implements processing for determining the destination computer (S201). Furthermore, the sub-management computer 20 also implements processing for determining the digital content components that are to be supplied (S202). The sub-management computer 20 then implements processing for supplying the digital content determined at S202 to the destination computer determined at S201 (S203). The sub-management computer 20 instructs the destination computer (or another computer in which it is provided (such as a business computer 21)), to execute the digital content (S204).

The foregoing description gave a general overview of the processing sequence. Steps S201 and S202 may be carried out in parallel or S201 may be carried out after S202.

Below, the contents of the processing carried out in each of the steps S201 to S204 will be described.

(1) Processing in S201

(1-1) First Example of Processing in S201

In this first example, the sub-management computer 20 determines that a business computer 21 or a virtual computer 50 newly added to the SAN 9 is to be the destination computer. Below, a concrete example of such a case is described.

For example, when a new business computer 21 has been connected to the SAN 9, it sends business computer information relating to itself (such as a computer name, IP address, or the like), to the sub-management computer 20. Moreover, if the virtual computer 50 is generated in a dynamic fashion, then either the virtual computer 50 itself, or the business computer 21 that has generated that virtual computer 50, sends virtual computer information for that virtual computer (such as a computer name, assigned IP address, or the like,) to the sub-management computer 20.

Upon receiving information relating to a computer, such as the business computer information or virtual computer information, the sub-management computer 20 determines the computer 21 or 50 corresponding to this computer information to be a destination computer. Furthermore, the sub-management computer 20 may also judge whether or not the received computer information has already been registered in the sub-manager composition information 600, and if it has not been registered, then this indicates that the business computer 21 or virtual computer 50 corresponding to that computer information has been newly connected to the SAN 9 (in other words, the computer has been added to the SAN system 4), and hence the sub-management computer 20 may determine that business computer 21 or virtual computer 50 to be a destination computer.

(1-2) Second Example of Processing in S201

Figure 28:
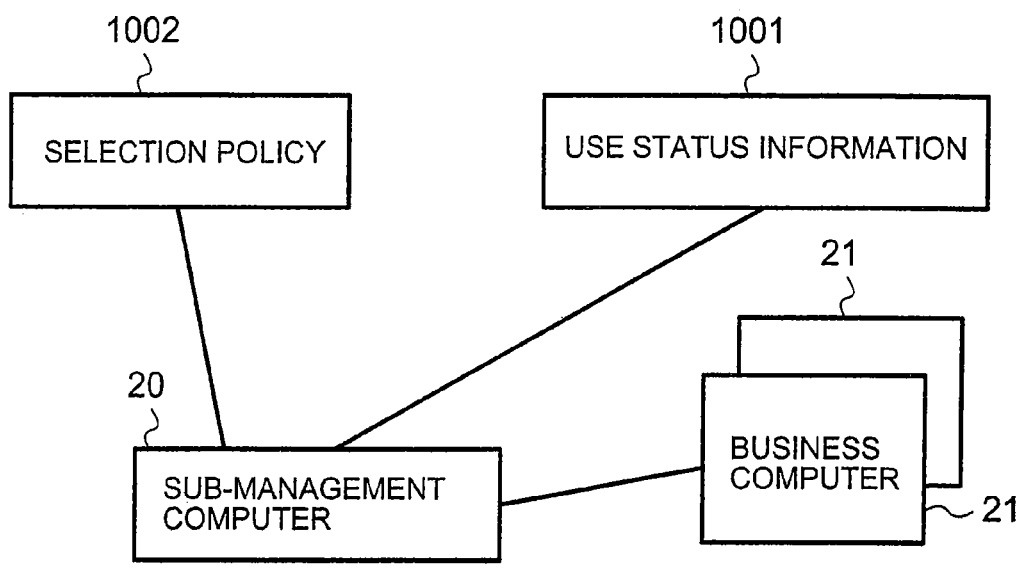
FIG. 28 shows a diagram for describing a second example of the processing in S201 in FIG. 27.

The sub-management computer 20 determines the destination computer on the basis of a selection policy and the status of destination candidate computers. Below, a concrete example is described with reference to FIG. 28.

Each of the respective business computers 21 reports its available resource status (for example, its memory or CPU use status) to the sub-management computer 20, either periodically or at a desired timing (for example, when the resource use status of the business computer 21 has changed). On the basis of available resource status thus reported, the sub-management computer 20 updates the use status information 1001, which records the respective use statuses of a plurality of business computers.

The name and importance of each digital content component (the importance being set, for example, in three levels: high, medium and low) is written to a selection policy 1002. The sub-management computer 20 ascertains the importance corresponding to the name of the selected digital content, from the selection policy 1002, and then determines the destination computer for that digital content, from the plurality of destination candidate computers (the plurality of computers registered in the sub-manager composition information 600), on the basis of the importance thus ascertained and the aforementioned use status information 1001. If, for example, the importance thus ascertained is high, then the sub-management computer 20 determines that computers having available resources of a prescribed amount or above are to be the destination computers. Furthermore, if, for example, the importance thus ascertained is low, then the sub-management computer 20 determines that computers having available resources of a prescribed amount or below are to be the destination computers.

Concrete examples of the processing in step S201 were given above. However, at S201, the user of the sub-management computer 20 may, for example, select the processing contents as he or she desires.

(2) Processing in S202

(2-1) First Example of S202

Figures 29, 30:
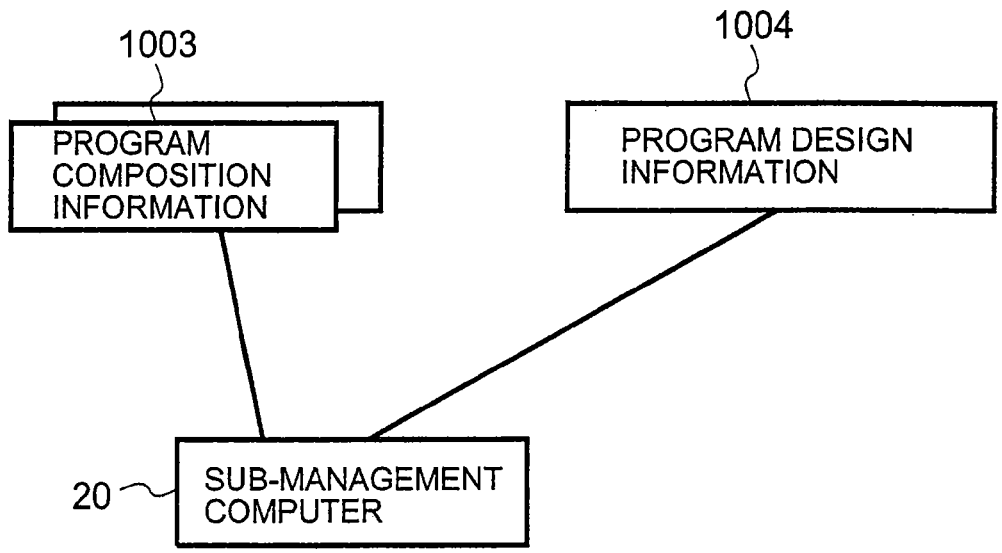
FIG. 29 shows a diagram for describing a first example of the processing in S202 in FIG. 27.
FIG. 30 shows one example of first digital content sub-data 802A used in the present embodiment.

On the basis of the program composition information for the destination computer determined at S201, the sub-management computer 20 selects the digital content to be supplied to that destination computer, from the plurality of digital content components stored in the supply management logical volume 60. For example, as shown in FIG. 29, if the sub-management computer 20 is able to identify the digital content components that are not present in the destination computer, regardless of whether or not they are supposed to be present in that computer, by referring to the program composition information 1003 of the destination computer determined at S201 and to the program design information indicating the program composition that is to be constructed, then it selects those digital content components as information to be supplied to the destination computer.

(2-2) Second Example of Processing in S202

Other information, such as environmental information (for example, resource information), may also be stated in the sub-manager composition information 600, in addition to the computer name and address of each destination candidate computer.

The sub-management computer 20 refers to the environmental information, and the like, of the destination computer determined at S201, and generates environmental setting data for establishing the digital content in the destination computer, on the basis of the referenced environmental information, and the like, and the digital content (for example, a business program or DBMS program) that has been set for supply.

The foregoing describes a concrete example of step S202. This description merely provides an example of step S202, and other types of methods may be adopted for determining the digital content.

(3) Processing in S203

(3-1) First Example of Processing in S203

The sub-management computer 20 copies the digital content selected at S202, from the supply management logical volume, to the business use logical volume 61 corresponding to the destination computer selected at S201 (or the business use logical volume 61 corresponding to the business use logical volume 61 containing the destination computer, if the destination computer is a virtual computer 50). Furthermore, the sub-management computer 20 stores the environmental setting data generated for the destination computer in the business use logical volume 61. The sub-management computer 20 also registers the computer ID of the destination computer (for example, the ID of the business computer 21 or the virtual computer 50 set as a supply destination) in the volume management table 805, in association with the volume ID of that business use logical volume 61, and it reports the storage data path name to the business use logical volume 61 (or a program generation request containing this storage data path name) in the aforementioned destination computer (or the business computer 21 containing same, if the destination computer is a virtual computer 50). The sub-management computer 20 may acquire the storage data path name corresponding to each digital content component, for example, rather than for each volume unit, from the storage data path information 803, and it may report this storage data path name (or a program generation request containing same).

In this case, the destination computer reads out the digital content in the business use logical volume 61 in accordance with the storage data path name. In this process, the storage management device 10 refers to the volume management table 805 and permits read out as long as the computer ID originating the access operation is associated with the volume ID of the logical volume that is to be accessed.

(3-2) Second Example of S203

The sub-management computer 20 may embed the computer ID of the destination computer (for example, the address information thereof,) in each of the digital content components (such as environmental setting data) in the supply management logical volume 60 (or the business use logical volume 61 corresponding to the destination computer). In this case, the destination computer may search the accessed logical volume 60 or 61 in order to find digital content that is embedded with its own computer ID, and it may read out only the digital content thus found.

The foregoing described a concrete example of S203. As stated above, information may be supplied by either a "pull" method (wherein a destination computer reads out digital content from the storage area 11 on the basis of information from the sub-management computer 20), or a "push" method (wherein the storage management device 10 reads out digital content from the storage area 11 and sends this information to a destination computer, on the basis of information from the sub-management computer 20).

Moreover, if the sub-management computer 20 sends a program generation request, or if it generates environmental setting data, then this program generation request or environmental setting data may be generated on the basis of the first digital content sub-data 820A as illustrated in FIG. 20, for example, in other words, the DBMS use indicator information and the DBMS shared use permission information relating to each of the digital content components. The DBMS use indicator information indicates whether or not the corresponding digital content uses a DBMS, and the DBMS shared use permission information indicates whether or not the DBMS can be shared with another program, according to the importance of the corresponding digital content (as specified by the user, for example). A concrete example is now described with reference to FIG. 23. For example, in a case where the sub-management computer 20 is supplying a business program 130B to the virtual computer 50B, if it is judged, from the program composition information of the business computer 21 containing that virtual computer 50B and the DBMS use indicator information and DBMS shared use permission information corresponding to the business program 130B, that the DBMS 920A is used by the virtual computer 50A, and that use of this DBMS 920A may be shared by the business program 130B, then environmental setting data is created for generating a business program 130B which shares use of the DBMS 920A, without disrupting the settings of the virtual computer 50A.

(4) Processing in S204

The sub-management computer 20 sends a program generation request containing a storage data path name to the destination computer (or the business computer containing same, if the destination computer is a virtual computer).

If a program generation request is contained in the storage data path name, then the destination computer (or the business computer 21 containing same, if the destination computer is a virtual computer 50) installs the digital content (program) in accordance with this request. Furthermore, when installation has been completed, the destination computer may send a request for closing the storage data path name, to the sub-management computer 20, in such a manner that the sub-management computer 20 closes the storage data path name that had been opened temporarily.

According to the present embodiment described above, provided that an agent storage management section 52 for managing communications with the storage system 12 is generated in at least a business computer 21 forming one of the destination candidate computers, then various types of programs, such as a virtual computer management section 51, a DBMS, or the like, can be constructed subsequently in the business computer 21, on the basis of the communications contents exchanged between the sub-management computer 20 and the agent storage management section 52. Inconvenient manual work is reduced in comparison with the prior art.

An embodiment of the present invention was described above, but this merely provides an example for the purpose of describing the present invention, and does not imply that the scope of the present invention is limited to this embodiment alone. The present invention may be implemented in various other modes.

What is claimed is:

1. A system comprising:
   a destination computer system;
   a storage system coupled to the destination computer system via a network; and a management computer system coupled to the destination computer system and to the storage system via the network, wherein the storage system comprises a plurality of logical volumes that are each a logical storage device, and a storage control device configured to control the plurality of logical volumes;

wherein contents are stored in a first logical volume of the plurality of logical volumes;

wherein the management computer sends to the storage system a push supply instruction of the stored contents;

wherein the storage system, in response to receiving the push supply instruction, copies the contents from the first logical volume to a second logical volume by using the storage control device;

wherein the storage system sets an access path used to transfer the contents between the second logical volume and the destination computer system;

wherein the storage control device sends the contents from the second logical volume to the destination computer system via the access path; and wherein the destination computer system installs the contents to the destination computer system.

2. The system of claim 1 wherein the destination computer installs the specified contents to the destination computer system in response to receiving a program generation request from the management computer system.

3. The system of claim 2 wherein the contents comprise a computer program to be executed by the destination computer system and data to be used by the computer program when executed by the destination computer system.

4. The system of claim 1 wherein the destination computer system is a virtual computer implemented on a physical computer system; and wherein the access path is a communication path between the virtual computer and the second logical volume.

5. The system of claim 4 wherein an address of the destination computer system is stored in the first logical volume, wherein the storage control device, in response to receiving the push supply instruction, copies the address of the destination computer system to the second logical volume; and wherein when the destination computer system determines whether the address stored in the second logical volume is same as its own address, installs the contents to the destination computer system only if the address is same.

6. A method for managing digital content, the method comprising:

receiving, by a management computer system, a request for content from a destination computer system, wherein the management computer system controls access to a storage system;

sending, by the management computer system, the request for the contents to the storage system;

copying, by the storage system, the requested content from a first logical volume to a second logical volume, the storage system comprising a plurality of logical volumes;

setting an access path across a network for communicating the content requested by the destination computer system between the second logical volume and the destination computer system;

sending, by the storage system, the requested contents from the second logical volume to the destination computer system via the access path; and installing, by the storage system, the requested content on the destination computer, wherein the content is accessed from the second logical volume across the access path and installed on the destination computer system.

7. The method of claim 6, further comprising:

receiving, at the destination computer system, a program generation request from the management computer system, wherein receiving the program generation request causes the destination computer system to install the requested content.

8. The method of claim 6 wherein the specified contents comprise a computer program to be executed by the destination computer system and data to be used by the computer program when executed by the destination computer system.

9. A system for managing digital content, the system comprising:

a storage system; and a management computer system coupled to the storage system via a network, wherein the storage system comprises a plurality of logical volumes that are each a logical storage device, and a storage control device configured to control the plurality of logical volumes;

wherein the management computer system is configured to receive, via the network, a request for contents from a destination computer;

wherein the storage system is coupled to the destination computer system via the network;

wherein the contents are stored in a first logical volume of the plurality of logical volumes;

wherein the management computer, in response to receiving the destination identification from the destination computer system, sends to the storage system a push delivery instruction of the stored contents with the destination identification;

wherein the storage system, in response to receiving the push delivery instruction with the destination identification, specifies the contents stored in the first logical volume using by the destination identification and copies the specified contents from the first logical volume to a second logical volume of the plurality of logical volumes by using the storage control device;

wherein the storage system sets an access path used to transfer the specified contents between the second logical volume and the destination computer system.

10. The system of claim 9 wherein the destination computer system installs the specified contents to the destination computer system in response to receiving the specified contents.

11. The system of claim 10 wherein the contents comprise a computer program to be executed by the destination computer system and data to be used by the computer program when executed by the destination computer system.

12. The system of claim 9 wherein the destination computer system installs the specified contents to the destination computer system in response to receiving a program generation request from the management computer system.

13. A system comprising:

a plurality of destination computer systems;

a management computer system; and a storage system coupled to the plurality of destination computer systems and the management computer system via a network, the storage system having a logical volume storing content comprising a virtual computer management section generating program, wherein the management computer system:

specifies one of the plurality of destination computer systems by referring a selection policy stored in the storage system;

sends to the storage system a request in order for the storage system to send the content to the specified destination computer system; and sends to the destination computer system a virtual computer generation request;

wherein the storage system in response to receiving the request, sets an access path between a logical volume storing the specified content and the specified destination computer system; and sends the specified contents from the logical volume to the destination computer system via the access path;

wherein the destination computer system, in response to receiving the virtual computer generation request, generates a virtual computer using the content sent from the storage system.

* * * * *